US011068929B2

(12) United States Patent
Moran

(10) Patent No.: US 11,068,929 B2
(45) Date of Patent: Jul. 20, 2021

(54) HIGHLY SCALABLE INTERNET-BASED CONTROLLED EXPERIMENT METHODS AND APPARATUS FOR OBTAINING INSIGHTS FROM TEST PROMOTION RESULTS

(71) Applicant: EVERSIGHT, INC., Palo Alto, CA (US)

(72) Inventor: David Moran, Palo Alto, CA (US)

(73) Assignee: EVERSIGHT, INC., Palo Alto, CA (US)

( * ) Notice: Subject to any disclaimer, the term of this patent is extended or adjusted under 35 U.S.C. 154(b) by 0 days.

(21) Appl. No.: 14/636,563

(22) Filed: Mar. 3, 2015

(65) Prior Publication Data

US 2017/0032407 A1 Feb. 2, 2017

Related U.S. Application Data

(63) Continuation-in-part of application No. 14/231,440, filed on Mar. 31, 2014, now Pat. No. 10,438,231, which is a continuation-in-part of application No. 14/209,851, filed on Mar. 13, 2014, now Pat. No. 9,984,387.

(Continued)

(51) Int. Cl.
*G06Q 30/00* (2012.01)
*G06Q 30/02* (2012.01)
*G06Q 10/06* (2012.01)

(52) U.S. Cl.
CPC ....... *G06Q 30/0244* (2013.01); *G06Q 10/063* (2013.01); *G06Q 30/0204* (2013.01); *G06Q 30/0242* (2013.01); *G06Q 30/0245* (2013.01)

(58) Field of Classification Search
CPC .......... G06Q 30/0277; G06Q 30/0269; G06Q 30/02; G06Q 30/0244; G06Q 10/063; G06Q 30/0204; G06Q 30/0242; G06Q 30/0245

See application file for complete search history.

(56) References Cited

U.S. PATENT DOCUMENTS 6,084,583 A * 7/2000 Gerszberg .............. G06Q 30/02
345/211
6,636,247 B1 * 10/2003 Hamzy .................. G06Q 30/02
705/14.73

(Continued)

OTHER PUBLICATIONS

Deodhar; Simultaneous Co-segmentation and Predictive Modeling for Large, Temporal Marketing Data; IEEE 2008; pp. 806-815; 2008.*

(Continued)

*Primary Examiner* — Radu Andrei
(74) *Attorney, Agent, or Firm* — Kang S. Lim

(57) ABSTRACT

Methods and apparatus for conducting test promotions in a highly scalable and cost-effective manner using controlled experiment methodology are disclosed. Test promotions of interest are presented to visitors of a website in a controlled experiment manner wherein each page presents one test promotion of interest among other promotions. The other promotions presented in the same page are kept constant in the pages. The visitors' responses with respect to the test promotions of interest are then recorded and analyzed to determine the performance of each presented test promotion of interest.

19 Claims, 24 Drawing Sheets

Related U.S. Application Data

(60) Provisional application No. 61/780,630, filed on Mar. 13, 2013.

(56) References Cited

U.S. PATENT DOCUMENTS

| | | | |
|---|---|---|---|
| 7,158,959 B1 | 1/2007 | Chickering et al. | |
| 7,376,603 B1 | 5/2008 | Mayr et al. | |
| 7,639,727 B1 | 12/2009 | Brisebois et al. | |
| 8,140,402 B1 | 3/2012 | Mesaros | |
| 9,037,287 B1* | 5/2015 | Grauberger | B07C 3/00 700/224 |
| 9,477,648 B1* | 10/2016 | Carter | G06Q 30/0243 |
| 9,542,693 B2* | 1/2017 | Brooks | G06Q 30/0643 |
| 9,947,018 B2* | 4/2018 | Brooks | G06Q 30/02 |
| 10,521,808 B2* | 12/2019 | Kitts | G06Q 30/0201 |
| 2001/0018665 A1* | 8/2001 | Sullivan | G07G 1/0036 705/14.65 |
| 2002/0023117 A1* | 2/2002 | Bernardin | G06F 9/465 718/104 |
| 2002/0026351 A1 | 2/2002 | Coleman | |
| 2002/0087453 A1 | 7/2002 | Nicolaisen et al. | |
| 2002/0161641 A1 | 10/2002 | Quinlan et al. | |
| 2002/0184086 A1 | 12/2002 | Linde | |
| 2003/0204437 A1 | 10/2003 | Flender et al. | |
| 2003/0233246 A1 | 12/2003 | Snapp et al. | |
| 2004/0039667 A1* | 2/2004 | Winklevoss | G06Q 40/00 705/35 |
| 2004/0093542 A1 | 5/2004 | Isodono et al. | |
| 2004/0123247 A1* | 6/2004 | Wachen | G06F 40/174 715/267 |
| 2004/0133457 A1 | 7/2004 | Sadiq et al. | |
| 2004/0148211 A1* | 7/2004 | Honarvar | G06Q 10/0639 705/7.11 |
| 2004/0204989 A1* | 10/2004 | Dicker | G06Q 30/0269 705/14.13 |
| 2004/0223648 A1 | 11/2004 | Hoene et al. | |
| 2005/0096963 A1 | 5/2005 | Myr et al. | |
| 2005/0171843 A1* | 8/2005 | Brazell | G06Q 30/02 705/14.13 |
| 2005/0189415 A1 | 9/2005 | Fano et al. | |
| 2005/0246206 A1 | 11/2005 | Obora et al. | |
| 2005/0256778 A1* | 11/2005 | Boyd | G06Q 30/06 705/14.43 |
| 2006/0259835 A1 | 11/2006 | Marinissen et al. | |
| 2007/0038516 A1* | 2/2007 | Apple | G06Q 30/02 705/14.42 |
| 2007/0073585 A1* | 3/2007 | Apple | G06Q 40/00 705/14.46 |
| 2008/0021909 A1 | 1/2008 | Black et al. | |
| 2008/0033784 A1* | 2/2008 | Chalimadugu | H04L 67/02 705/7.29 |
| 2008/0033808 A1* | 2/2008 | Black | G06Q 30/0256 705/14.54 |
| 2008/0140502 A1 | 6/2008 | Birnholz et al. | |
| 2008/0189156 A1 | 8/2008 | Voda et al. | |
| 2009/0012847 A1* | 1/2009 | Brooks | G06Q 30/0201 705/14.41 |
| 2009/0012848 A1* | 1/2009 | Brooks | G06Q 30/02 705/7.29 |
| 2009/0012927 A1* | 1/2009 | Brooks | G06N 5/02 706/52 |
| 2009/0204472 A1 | 8/2009 | Einhorn | |
| 2009/0254413 A1 | 10/2009 | Chang et al. | |
| 2009/0282343 A1 | 11/2009 | Catlin et al. | |
| 2009/0292588 A1* | 11/2009 | Duzevik | G06N 3/126 705/7.29 |
| 2009/0292771 A1 | 11/2009 | Bertoni et al. | |
| 2009/0307073 A1 | 12/2009 | MirrokniBanadaki et al. | |
| 2009/0327075 A1* | 12/2009 | Saadat | G06Q 30/02 705/14.53 |
| 2010/0153332 A1 | 6/2010 | Rollins et al. | |
| 2010/0175084 A1* | 7/2010 | Ellis | H04N 21/482 725/32 |
| 2010/0274661 A1* | 10/2010 | Aaltonen | G06Q 30/02 705/14.42 |
| 2011/0022470 A1* | 1/2011 | Varadarajan | G06Q 30/02 705/14.61 |
| 2011/0045831 A1 | 2/2011 | Chiu et al. | |
| 2011/0119155 A1 | 5/2011 | Hammad et al. | |
| 2011/0161113 A1 | 6/2011 | Rumak et al. | |
| 2011/0173055 A1 | 7/2011 | Ross et al. | |
| 2011/0258049 A1 | 10/2011 | Ramer et al. | |
| 2011/0295722 A1 | 12/2011 | Reisman | |
| 2012/0021814 A1* | 1/2012 | Gurovich | G07F 17/3283 463/16 |
| 2012/0158099 A1 | 6/2012 | Lee | |
| 2012/0290399 A1 | 11/2012 | England et al. | |
| 2013/0073336 A1* | 3/2013 | Heath | G06Q 30/02 705/7.29 |
| 2013/0073388 A1 | 3/2013 | Heath | |
| 2013/0097006 A1 | 4/2013 | Evans et al. | |
| 2013/0110641 A1 | 5/2013 | Ormont et al. | |
| 2013/0110880 A1 | 5/2013 | Farchi et al. | |
| 2013/0124257 A1 | 5/2013 | Schubert | |
| 2013/0138812 A1 | 5/2013 | Assuncao et al. | |
| 2013/0148813 A1 | 6/2013 | Sengupta et al. | |
| 2013/0226658 A1* | 8/2013 | Ito | G06Q 30/0201 705/7.29 |
| 2013/0290094 A1* | 10/2013 | Srivastava | G06Q 30/0245 705/14.44 |
| 2013/0297543 A1 | 11/2013 | Treiser | |
| 2013/0346302 A1 | 12/2013 | Purves et al. | |
| 2014/0012677 A1* | 1/2014 | Wagner | H04W 4/00 705/14.64 |
| 2014/0025391 A1* | 1/2014 | Knowles | G06Q 30/0222 705/2 |
| 2014/0046872 A1 | 2/2014 | Arnott et al. | |
| 2014/0074589 A1* | 3/2014 | Nielsen | G06Q 30/0271 705/14.43 |
| 2014/0081636 A1 | 3/2014 | Erhart et al. | |
| 2014/0081741 A1 | 3/2014 | Katsur | |
| 2014/0095611 A1 | 4/2014 | Weinstein et al. | |
| 2014/0122200 A1 | 5/2014 | Granville | |
| 2014/0143405 A1 | 5/2014 | Pavlidis et al. | |
| 2014/0149230 A1* | 5/2014 | Shepard | G06Q 30/0273 705/14.69 |
| 2014/0180790 A1* | 6/2014 | Boal | G06Q 30/0211 705/14.42 |
| 2014/0188615 A1* | 7/2014 | Badenhop | G06Q 30/0267 705/14.58 |
| 2014/0188616 A1* | 7/2014 | Badenhop | G06Q 30/0267 705/14.58 |
| 2014/0255896 A1* | 9/2014 | Saha | G09B 7/00 434/350 |
| 2014/0278786 A1 | 9/2014 | Liu-Qiu-Yan | |
| 2014/0278798 A1 | 9/2014 | Goyal et al. | |
| 2014/0337120 A1 | 11/2014 | Ercanbrack | |
| 2015/0049924 A1 | 2/2015 | Tang et al. | |
| 2015/0117631 A1 | 4/2015 | Tuchman et al. | |
| 2015/0213465 A1* | 7/2015 | Noyes | G06Q 30/0206 705/7.35 |
| 2015/0310188 A1* | 10/2015 | Ford | H04L 63/0428 726/28 |
| 2016/0034927 A1* | 2/2016 | Grushka | G06Q 30/0202 705/7.31 |
| 2016/0048855 A1* | 2/2016 | Ambrozic | G06Q 30/0203 705/7.32 |
| 2016/0071162 A1* | 3/2016 | Ogawa | G06Q 50/01 705/14.66 |
| 2016/0155193 A1 | 6/2016 | Merrill et al. | |
| 2016/0245863 A1* | 8/2016 | Mrugalski | G01R 31/318547 |

OTHER PUBLICATIONS

Nikulin; Method for Data Stream Aggregation; 2015 IEEE; 8 pages; 2015.*

* cited by examiner

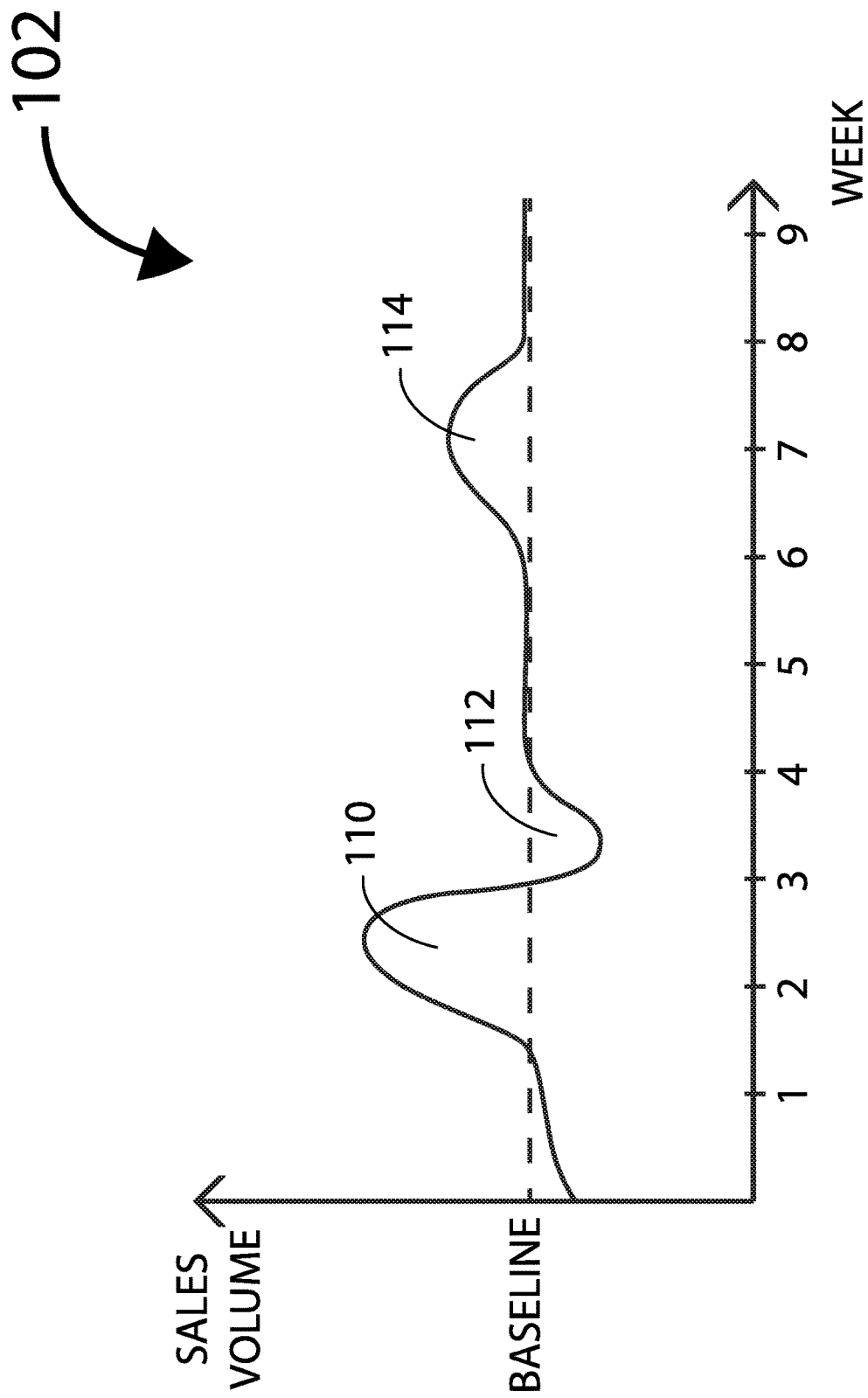

$ OFF TEMPLATES
$ off Qty Product A
$ off either Qty Product A or Qty Product B
$ off when you buy both Qty Product A and Qty Product B
When you buy Qty Product A, $ off Qty Product B
When you buy Qty Product A, $ off either Qty Product B or Qty Product C
When you buy both Qty Product A and Qty Product B, $ off Qty Product C

1002

% OFF TEMPLATES
% off Qty Product A
% off either Qty Product A or Qty Product B
% off when you buy both Qty Product A and Qty Product B
When you buy Qty Product A, % off Qty Product B
When you buy Qty Product A, % off either Qty Product B or Qty Product C
When you buy both Qty Product A and Qty Product B, % off Qty Product C

1004

FREE TEMPLATES
Buy Qty Product A, get Qty Free
Buy Qty Product A, get Qty Product B Free
Buy either Qty Product A or Qty Product B, get Qty Product C Free
Buy both Qty Product A or Qty Product B, get Qty Product C Free

1006

TOTAL PRICE TEMPLATES
Buy Qty Product A for total price
Buy both Qty Product A or Qty Product B for total price

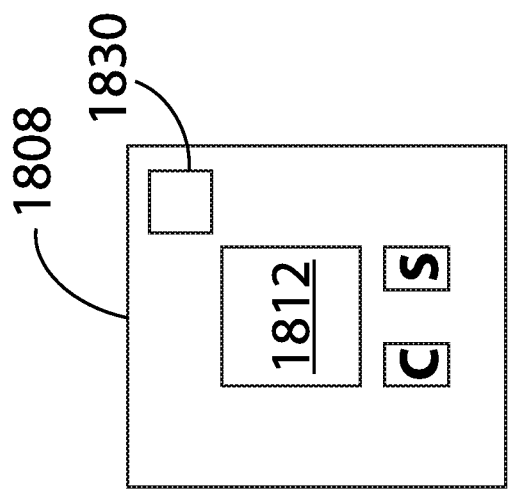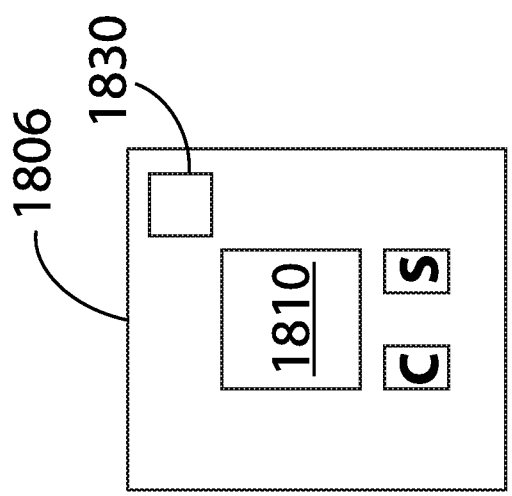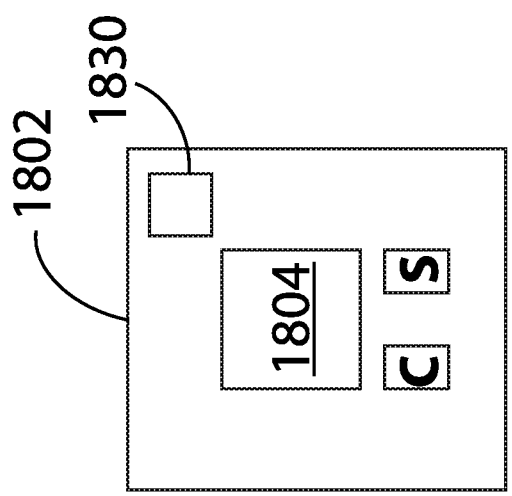
FIG. 18A

HIGHLY SCALABLE INTERNET-BASED CONTROLLED EXPERIMENT METHODS AND APPARATUS FOR OBTAINING INSIGHTS FROM TEST PROMOTION RESULTS

PRIORITY CLAIM

The present invention is a continuation-in-part of a commonly owned US patent application entitled "Automatic Offer Generation Using Concept Generator Apparatus and Methods Thereof," U.S. application Ser. No. 14/231,440, filed in the USPTO on Mar. 31, 2014, by inventor Moran et al., which is a continuation-in-part of a commonly owned patent application entitled "Architecture and Methods for Promotion Optimization," U.S. application Ser. No. 14/209,851, filed in the USPTO on Mar. 13, 2014, by inventor Moran, which claims priority under 35 U.S.C. 119(e) to a commonly owned US provisional patent application, entitled "Architecture and Methods for Promotion Optimization," U.S. Application No. 61/780,630, filed in the USPTO on Mar. 13, 2013, by inventor Moran, all of which is incorporated herein by reference.

RELATED APPLICATIONS

The present invention is related to the following applications, all of which are incorporated herein by reference:

Commonly owned application entitled "Adaptive Experimentation and Optimization in Automated Promotional Testing," application Ser. No. 14/231,426, filed on Mar. 31, 2014 in the USPTO by Moran et al.

Commonly owned application entitled "Automated and Optimal Promotional Experimental Test Designs Incorporating Constraints," application Ser. No. 14/231,432, filed on Mar. 31, 2014 in the USPTO by Moran et al.

Commonly owned application entitled "Automated Event Correlation to Improve Promotional Testing," application Ser. No. 14/231,442, filed on Mar. 31, 2014 in the USPTO by Moran et al.

Commonly owned application entitled "Automated Promotion Forecasting and Methods Therefor" application Ser. No. 14/231,460, filed on Mar. 31, 2014 in the USPTO by Moran et al.

Commonly owned application entitled "Automated Behavioral Economics Patterns in Promotion Testing and Methods Therefor" application Ser. No. 14/231,555, filed on Mar. 31, 2014 in the USPTO by Moran et al.

Commonly owned application entitled "Automatic Mass Scale Online Promotion Testing," application Ser. No. 14/311,250, filed Jun. 21, 2014 in the USPTO by Moran el al.

BACKGROUND OF THE INVENTION

The present invention relates to promotion optimization methods and apparatus therefor. More particularly, the present invention relates to computer-implemented methods and computer-implemented apparatus for optimizing, promotions.

Promotion refers to various practices designed to increase sales of a particular product or services and/or the profit associated with such sales. Generally speaking, the public often associates promotion with the sale of consumer goods and services, including consumer packaged goods (e.g., food, home and personal care), consumer durables (e.g., consumer appliances, consumer electronics, automotive leasing), consumer services (e.g., retail financial services, health care, insurance, home repair, beauty and personal care), and travel and hospitality (e.g., hotels, airline flights, and restaurants). Promotion is particularly heavily involved in the sale of consumer packaged goods (i.e., consumer goods packaged for sale to an end consumer). However, promotion occurs in almost any industry that offers goods or services to a buyer (whether the buyer is an end consumer or an intermediate entity between the producer and the end consumer).

The term promotion may refer to, for example, providing discounts (using for example a physical or electronic coupon or code) designed to, for example, promote the sales volume of a particular product or service. One aspect of promotion may also refer to the bundling of goods or services to create a more desirable selling unit such, that sales volume may be improved. Another aspect of promotion may also refer to the merchandising design (with respect to looks, weight, design, color, etc.) or displaying of a particular product with a view to increasing its sales volume, it includes calls to action or marketing claims used in-store, on marketing collaterals, or on the package to drive demand. Promotions may be composed of all or some of the following: price based claims, secondary displays or aisle end-caps in a retail store, shelf signage, temporary packaging, placement in a retailer circular/flyer/coupon book, a colored price tag, advertising claims, or other special incentives intended to drive consideration and purchase behavior. These examples are meant to be illustrative and not limiting.

In discussing various embodiments of the present invention, the sale of consumer packaged goods (hereinafter "CPG") is employed to facilitate discussion and ease of understanding. It should be kept in mind, however, that the promotion optimization methods and apparatuses discussed herein may apply to any industry in which promotion has been employed in the past or may be employed in the future.

Further, price discount is employed as an example to explain the promotion methods and apparatuses herein. It should be understood, however, that promotion optimization may be employed to manipulate factors other than price discount in order to influence the sales volume. An example of such other factors may include the call to action on a display or on the packaging, the size of the CPG item, the manner in which the item is displayed or promoted or advertised either in the store or in media, etc.

Generally speaking, it has been estimated that, on average, 17% of the revenue in the consumer packaged goods (CPG) industry is spent to fund various types of promotions, including discounts, designed to entice consumers to try and/or to purchase the packaged goods. In a typical example, the retailer (such as a grocery store) may offer a discount online or via a print circular to consumers. The promotion may be specifically targeted to an individual consumer (based on, for example, that consumer's demographics or past buying behavior). The discount may alternatively be broadly offered to the general public. Examples of promotions offered to general public include for example, a printed or electronic redeemable discount (e.g., coupon or code) for a specific CPG item. Another promotion example may include, for example, general advertising of the reduced price of a CPG item in a particular geographic area. Another promotion example may include in-store marking down of a particular CPG item only for a loyally card user base.

In an example, if the consumer redeems the coupon or electronic code, the consumer is entitled to a reduced price for the CPG item. The revenue loss to the retailer due to the redeemed discount may be reimbursed, wholly or partly, by the manufacturer of the CPG item in a separate transaction.

Because promotion is expensive (in terms of, for example, the effort to conduct a promotion campaign and/or the per-unit revenue loss to the retailer/manufacturer when the consumer decides to take advantage of the discount), efforts are continually made to minimize promotion cost while maximizing the return on promotion dollars investment. This effort is known in the industry as promotion optimization.

For example, a typical promotion optimization method may involve examining the sales volume of a particular CPG item over time (e.g., weeks). The sales volume may be represented by a demand curve as a function of time, for example. A demand curve lift (excess over baseline) or dip (below baseline) for a particular time period would be examined to understand why the sales volume for that CPG item increases or decreases during such time period.

FIG. 1 shows an example demand curve 102 for Brand X cookies over some period of time. Two lifts 110 and 114 and one dip 112 in demand curve 102 are shown in the example of FIG. 1. Lift 110 shows that the demand for Brand X cookies exceeds the baseline at least during week 2. By examining the promotion effort that was undertaken at that time (e.g., in the vicinity of weeks 1-4 or week 2) for Brand X cookies, marketers have in the past attempted to judge the effectiveness of the promotion effort on the sales volume. If the sales volume is deemed to have been caused by the promotion effort and delivers certain financial performance metrics, that promotion effort is deemed to have been successful and may be replicated in the future in an attempt to increase the sales volume. On the other hand, dip 112 is examined in an attempt to understand why the demand falls off during that time (e.g., weeks 3 and 4 in FIG. 1). If the decrease in demand was due to the promotion in week 2 (also known as consumer pantry loading or retailer forward-buying, depending on whether the sales volume shown reflects the sales to consumers or the sales to retailers), this decrease in weeks 3 and 4 should be counted against the effectiveness of week 2.

One problem with the approach employed in the prior art has been the fact that the prior art approach is a backward-looking approach based on aggregate historical data. In other words, the prior art approach attempts to ascertain the nature and extent of the relationship between the promotion and the sales volume by examining aggregate data collected in the past. The use of historical data, while having some disadvantages (which are discussed later herein below), is not necessarily a problem. However, when such data is in the form of aggregate data (such as in simple terms of sales volume of Brand X cookies versus time for a particular store or geographic area), it is impossible to extract from such aggregate historical data all of the other factors that may more logically explain a particular lift or dip in the demand curve.

To elaborate, current promotion optimization approaches tend to evaluate sales lifts or dips as a function of four main factors: discount depth (e.g., how much was the discount on the CPG item), discount duration (e.g., how long did the promotion campaign last), timing (e.g., whether there was any special holidays or event or weather involved), and promotion type (e.g., whether the promotion was a price discount only, whether Brand X cookies were displayed/not displayed prominently, whether Brand X cookies were features/not featured in the promotion literature).

However, there may exist other factors that contribute to the sales lift or dip, and such factors are often not discoverable by examining, in a backward-looking manner, the historical aggregate sales volume data for Brand X cookies. This is because there is not enough information in the aggregate sales volume data to enable the extraction of information pertaining to unanticipated or seemingly unrelated events that may have happened during the sales lifts and dips and may have actually contributed to the sales lifts and dips.

Suppose, for example, that there was a discount promotion for Brand X cookies during the time when lift 110 in the demand curve 102 happens. However, during the same time, there was a breakdown in the distribution chain of Brand Y cookies, a competitor's cookies brand which many consumers view to be an equivalent substitute for Brand X cookies. With Brand Y cookies being in short supply in the store, many consumers, bought Brand X instead for convenience sake. Aggregate historical sales volume data for Brand X cookies, when examined after the fact in isolation by Brand X marketing department thousands of miles away, would not uncover that fact. As a result, Brand X marketers may make the mistaken assumption that the costly promotion effort of Brand X cookies was solely responsible for the sales lift and should be continued, despite the fact that it was an unrelated event that contributed to most of the lift in the sales volume of Brand X cookies.

As another example, suppose, for example, that milk produced by a particular unrelated vendor was heavily promoted in the same grocery store or in a different grocery store nearby during the week that Brand X cookies experienced the sales lift 110. The milk may have been highlighted in the weekly circular, placed in a highly visible location in the store and/or a milk industry expert may have been present in the store to push buyers to purchase milk, for example. Many consumers ended up buying milk because of this effort whereas some of most of those consumers who bought during the milk promotion may have waited another week or so until they finished consuming the milk they bought in the previous weeks. Further, many of those milk-buying consumers during this period also purchased cookies out of an ingrained milk-and-cookies habit. Aggregate historical sales volume data for Brand X cookies would not uncover that fact unless the person analyzing the historical aggregate sales volume data for Brand X cookies happened to be present in the store during that week and had the insight to note that milk was heavily promoted that week and also the insight that increased milk buying may have an influence on the sales volume of Brand X cookies.

Software may try to take these unanticipated events into account but unless every SKU (stock keeping unit) in that store and in stores within commuting distance and all events, whether seemingly related or unrelated to the sales of Brand X cookies, are modeled, it is impossible to eliminate data noise from the backward-looking analysis based on aggregate historical sales data.

Even without the presence of unanticipated factors, a marketing person working for Brand X may be interested in knowing whether the relatively modest sales lift 114 comes from purchases made by regular Brand X cookies buyers or by new buyers being enticed by some aspect of the promotion campaign to buy Brand X cookies for the first time. If Brand X marketer can ascertain that most of the lift in sales during the promotion period that spans lift 114 comes from new consumers of Brand X cookies, such marketer may be willing to spend more money on the same type of sales promotion, even to the point of tolerating a negative ROI (return on investment) on his promotion dollars for this particular type of promotion since the recruitment of new buyers to a brand is deemed more much valuable to the company in the long run than the temporary increase in sales to existing Brand X buyers. Again, aggregate historical sales volume data for Brand X cookies, when examined in a backward-looking manner, would not provide such information.

Furthermore, even if all unrelated and related events and factors can be modeled, the fact that the approach is backward-looking means that there is no way to validate the hypothesis about the effect an event has on the sales volume since the event has already occurred in the past. With respect to the example involving the effect of milk promotion on Brand X cookies sales, there is no way to test the theory short of duplicating the milk shortage problem again. Even if the milk shortage problem could be duplicated again for testing purposes, other conditions have changed, including the fact that most consumers who bought milk during that period would not need to or be in a position to buy milk again in a long time. Some factors, such as weather, cannot be duplicated, making theory verification challenging.

Attempts have been made to employ non-aggregate sales data in promoting products. For example, some companies may employ a loyalty card program (such as the type commonly used in grocery stores or drug stores) to keep track of purchases by individual consumers. If an individual consumer has been buying sugar-free cereal, for example, the manufacturer of a new type of whole grain cereal may wish to offer a discount to that particular consumer to entice that consumer to try out the new whole grain cereal based on the theory that people who bought sugar-free cereal tend to be more health conscious and thus more likely to purchase whole grain cereal than the general cereal-consuming public. Such individualized discount may take the form of, for example, a redeemable discount such as a coupon or a discount code mailed or emailed to that individual.

Some companies may vary the approach by, for example, ascertaining the items purchased by the consumer at the point of sale terminal and offering a redeemable code on the purchase receipt. Irrespective of the approach taken, the utilization of non-aggregate sales data has typically resulted in individualized offers, and has not been processed or integrated in any meaningful sense into a promotion optimization effort to determine the most cost-efficient, highest-return manner to promote a particular CPG item to the general public.

Attempts have also been made to obtain from the consumers themselves indications of future buying behavior instead of relying on a backward-looking approach. For example, conjoint studies, one of the stated preference methods, have been attempted in which consumers are asked to state preferences. In an example conjoint study, a consumer may be approached at the store and asked a series of questions designed to uncover the consumer's future shopping behavior when presented with different promotions. Questions may be asked include, for example, "do you prefer Brand X or Brand Y" or "do you spend less than $100 or more than $100 weekly on grocery" or "do you prefer chocolate cookies or oatmeal cookies" or "do you prefer a 50-cent-off coupon or a 2-for-1 deal on cookies". The consumer may state his preference on each of the questions posed (thus making this study a conjoint study on stated preference).

However, such conjoint studies have proven to be an expensive way to obtain non-historical data. If the conjoint studies are presented via a computer, most users may ignore the questions and/or refuse to participate. If human field personnel are employed to talk to individual consumers to conduct the conjoint study, the cost of such studies tends to be quite high due to salary cost of the human field personnel and may make the extensive use of such conjoint studies impractical.

Further and more importantly, it has been known that conjoint studies are somewhat unreliable in gauging actual purchasing behavior by consumers in the future. An individual may state out of guilt and the knowledge that he needs to lose weight that he will not purchase any cookies in the next six months, irrespective of discounts. In actuality, that individual may pick up a package of cookies every week if such package is carried in a certain small size that is less guilt-inducing and/or if the package of cookies is prominently displayed next to the milk refrigerator and/or if a 10% off discount coupon is available. If a promotion effort is based on such flawed stated preference data, discounts may be inefficiently deployed in the future, costing the manufacturer more money than necessary for the promotion.

Finally, none of the approaches track the long-term impact of a promotion's effect on brand equity for an individual's buying behavior over time. Some promotions, even if deemed a success by traditional short-term measures, could have damaging long-term consequences. Increased price-based discounting, for example, can lead to consumers increasing the weight of price in determining their purchase decisions, making consumers more deal-prone and reluctant to buy at full price, leading to less loyalty to brands and retail outlets.

In view of the foregoing, there are desired improved methods and apparatuses for optimizing promotions in a manner that results in cost-effective, high-return, and timely promotions to the general public.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which:

FIG. 1 shows an example demand curve 102 for Brand X cookies over some period of time.

FIG. 10 shows, in greater detail and in accordance with an embodiment of the invention, example options that may be selected by the user via offer template module 904.

FIG. 18A illustrates, in accordance with one or more embodiments of the invention, a parallel experiment approach wherein each webpage presented to the visitor shows only a single test promotion.

DETAILED DESCRIPTION OF VARIOUS EMBODIMENTS

Figure 2A:
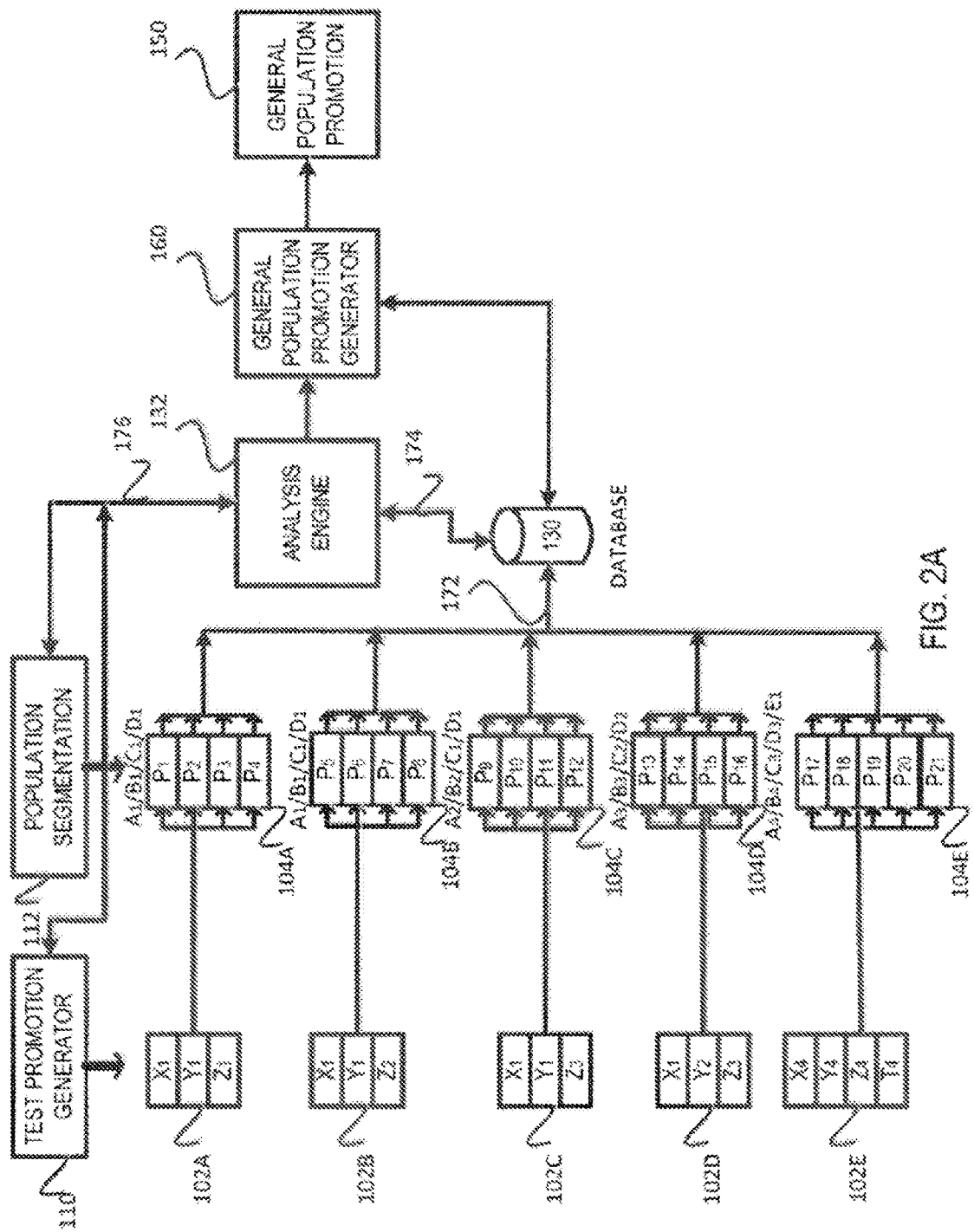
FIG. 2A shows, in accordance with an embodiment of the invention, a conceptual drawing of the forward-looking promotion optimization method.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include any of the data processing devices, including for example smart phones, tablet computers, laptop computers, of a general-purpose computers and/or dedicated computing devices when appropriately programmed and may include a combination of a computer/computing device and dedicated/programmable circuits adapted for the various tasks pertaining to embodiments of the invention. Such a data processing device include, as is well-known, at least a processor unit, a memory unit, a graphic processing unit, a data storage unit (such as a hard drive or semiconductor-based data storage device), one or more I/O circuits, one or more data communication subsystems, and/or operating system/applications for executing executable code. Data processing devices are well-known and are not discussed in greater detail herein for brevity's sake. The apparatuses may be stand-alone or may be coupled together using a network, such as a local area network, an intranet, an internet, or an combination thereof.

One or more embodiments of the invention relate to methods and apparatus for optimizing promotions by administering, in large numbers and iteratively, test promotions on purposefully segmented subpopulations in advance of a general public promotion roll-out. In one or more embodiments, the inventive forward-looking promotion optimization (FL-PO) involves obtaining actual revealed preferences from individual consumers of the segmented subpopulations being tested.

The revealed preferences are obtained when the individual consumers respond to specifically designed actual test promotions. The revealed preferences are tracked in individual computer-implemented accounts (which may, for example, be implemented via a record in a centralized database and rendered accessible to the merchant or the consumer via a computer network such as the internet) associated with individual consumers. For example, when a consumer responds, using his smart phone or web browser, to a test promotion that offers 20% off a particular consumer packaged goods (CPG) item, that response is tracked in his individual computer-implemented account. Such computer-implemented accounts may be implemented via, for example, a loyalty card program, apps on a smart phone, computerized records accessible via a browser, social media news feed, etc.

In one or more embodiments, a plurality of test promotions may be designed and tested on a plurality of groups of consumers (the groups of consumers are referred to herein as "subpopulations"). The responses by the consumers are recorded and analyzed, with the analysis result employed to generate additional test promotions or to formulate the general population promotion.

As will be discussed later herein, if the consumer actually redeems the offer, one type of response is recorded and noted in the computer-implemented account of that consumer. Even if an action by the consumer does not involve actually redeeming or actually taking advantage of the promotional offer right away, an action by that consumer may, however, constitute a response that indicates a level of interest or lack of interest and may still be useful in revealing the consumer preference (or lack thereof). For example, if a consumer saves an electronic coupon (offered as part of a test promotion) in his electronic coupon folder or forwards that coupon to a friend via an email or a social website, that action may indicate a certain level of interest and may be useful in determining the effectiveness of a given test promotion. Different types of responses by the consumers may be accorded different weights, in one or more embodiments.

The groups of consumers involved in promotion testing represent segments of the public that have been purposefully segmented in accordance with segmenting criteria specifically designed for the purpose of testing the test promotions. As the term is employed herein, a subpopulation is deemed purposefully segmented when its members are selected based on criteria other than merely to make up a given number of members in the subpopulation. Demographics, buying behavior, behavioral economics are example criteria that may be employed to purposefully segment a population into subpopulations for promotion testing. In an example, a segmented population may number in the tens or hundreds or even thousands of individuals. In contrast, the general public may involve tens of thousands, hundreds of thousands, or millions of potential customers.

By purposefully segmenting the public into small subpopulations for promotion testing, embodiments of the invention can exert control over variables such as demographics (e.g., age, income, sex, marriage status, address, etc.), buying behavior (e.g., regular purchaser of Brand X cookies, consumer of premium food, frequent traveler, etc), weather, shopping habits, life style, and/or any other criteria suitable for use in creating the subpopulations. More importantly, the subpopulations are kept small such that multiple test promotions may be executed on different subpopulations, either simultaneously or at different times, without undue cost or delay in order to obtain data pertaining to the test promotion response behavior. The low cost/low delay aspect of creating and executing test promotions on purposefully segmented subpopulations permits, for example, what-if testing, testing in statistically significant numbers of tests, and/or iterative testing to isolate winning features in test promotions.

Generally speaking, each individual test promotion may be designed to test one or more test promotion variables. These test promotions variables may relate to, for example, the size, shape, color, manner of display, manner of discount, manner of publicizing, manner of dissemination pertaining to the goods/services being promoted.

As a very simple example, one test promotion may involve 12-oz packages of fancy-cut potato chips with medium salt and a discount of 30% off the regular price. This test promotion may be tested on a purposefully segmented subpopulation of 35-40 years old professionals in the $30,000-$50,000 annual income range. Another test promotion may involve the same 30% discount 12-oz packages of fancy-cut potato chips with medium salt on a different purposefully segmented subpopulation of 35-40 years old professionals in the higher $100,000-$150,000 annual income range. By controlling all variables except for income range, the responses of these two test promotions, if repeated in statistically significant numbers, would likely yield fairly accurate information regarding the relationship between income for 35-40 years old professionals and their actual preference for 12-oz packages of fancy cut potato chips with medium salt.

In designing different test promotions, one or more of the test promotions variables may vary or one or more of the segmenting criteria employed to create the purposefully segmented subpopulations may vary. The test promotion responses from individuals in the subpopulations are then collected and analyzed to ascertain which test promotion or test promotion variable(s) yields/yield the most desirable response (based on some predefined success criteria, for example).

Further, the test promotions can also reveal insights regarding which subpopulation performs the best or well with respect to test promotion responses. In this manner, test promotion response analysis provides insights not only regarding the relative performance of the test promotion and/or test promotion variable but also insights regarding population segmentation and/or segmentation criteria. In an embodiment, it is contemplated that the segments may be arbitrarily or randomly segmented into groups and test promotions may be executed against these arbitrarily segmented groups in order to obtain insights regarding personal characteristics that respond well to a particular type of promotion.

In an embodiment, the identified test promotion variable(s) that yield the most desirable responses may then be employed to formulate a general public promotion (GPP), which may then be offered to the larger public. A general public promotion is different from a test promotion in that a general public promotion is a promotion designed to be offered to members of the public to increase or maximize sales or profit whereas a test promotion is designed to be targeted to a small group of individuals fitting a specific segmentation criteria for the purpose of promotion testing. Examples of general public promotions include (but not limited to) advertisement printed in newspapers, release in public forums and websites, flyers for general distribution, announcement on radios or television, and/or promotion broadly transmitted or made available to members of the public. The general public promotion may take the form of a paper or electronic circular that offers the same promotion to the larger public, for example.

Alternatively or additionally, promotion testing may be iterated over and over with different subpopulations (segmented using the same or different segmenting criteria) and different test promotions (devised using the same or different combinations of test promotion variables) in order to validate one or more the test promotion response analysis result(s) prior to the formation of the generalized public promotion. In this manner, "false positives" may be reduced.

Since a test promotion may involve many test promotion variables, iterative test promotion testing, as mentioned, may help pin-point a variable (i.e., promotion feature) that yields the most desirable test promotion response to a particular subpopulation or to the general public.

Suppose, for example, that a manufacturer wishes to find out the most effective test promotion for packaged potato chips. One test promotion may reveal that consumers tend to buy a greater quantity of potato chips when packaged in brown paper bags versus green paper bags. That "winning" test promotion variable value (i.e., brown paper bag packaging) may be retested in another set of test promotions using different combinations of test promotion variables (such as for example with different prices, different display options, etc.) on the same or different purposefully segmented subpopulations. The follow-up test promotions may be iterated multiple times in different test promotion variable combinations and/or with different test subpopulations to validate that there is, for example, a significant consumer preference for brown paper bag packaging over other types of packaging for potato chips.

Further, individual "winning" test promotion variable values from different test promotions may be combined to enhance the efficacy of the general public promotion to be created. For example, if a 2-for-1 discount is found to be another winning variable value (e.g., consumers tend to buy a greater quantity of potato chips when offered a 2-for-1 discount), that winning test promotion variable value (e.g., the aforementioned 2-for-1 discount) of the winning test promotion variable (e.g., discount depth) may be combined with the brown paper packaging winning variable value to yield a promotion that involves discounting 2-for-1 potato chips in brown paper bag packaging.

The promotion involving discounting 2-for-1 potato chips in brown paper bag packaging may be tested further to validate the hypothesis that such a combination elicits a more desirable response than the response from test promotions using only brown paper bag packaging or from test promotions using only 2-for-1 discounts. As many of the "winning" test promotion variable values may be identified and combined in a single promotion as desired. At some point, a combination of "winning" test promotion variables (involving one, two, three, or more "winning" test promotion variables) may be employed to create the general public promotion, in one or more embodiments.

In one or more embodiments, test promotions may be executed iteratively and/or in a continual fashion on different purposefully segmented subpopulations using different combinations of test promotion variables to continue to obtain insights into consumer actual revealed preferences, even as those preferences change over time. Note that the consumer responses that are obtained from the test promotions are actual revealed preferences instead of stated preferences. In other words, the data obtained from the test promotions administered in accordance with embodiments of the invention pertains to what individual consumers actually do when presented with the actual promotions. The data is tracked and available for analysis and/or verification in individual computer-implemented accounts of individual consumers involved in the test promotions. This revealed preference approach is opposed to a stated preference approach, which stated preference data is obtained when the consumer states what he would hypothetically do in response to, for example, a hypothetically posed conjoint test question.

As such, the actual preference test promotion response data obtained in accordance with embodiments of the present invention is a more reliable indicator of what a general population member may be expected to behave when presented with the same or a similar promotion in a general public promotion. Accordingly, there is a closer relationship between the test promotion response behavior (obtained in response to the test promotions) and the general public response behavior when a general public promotion is generated based on such test promotion response data.

Also, the lower face validity of a stated preference test, even if the insights have statistical relevance, poses a practical challenge; CPG manufacturers who conduct such tests have to then communicate the insights to a retailer in order to drive real-world behavior, and convincing retailers of the validity of these tests after the fact can lead to lower credibility and lower adoption, or "signal loss" as the top concepts from these tests get re-interpreted by a third party, the retailer, who wasn't involved in the original test design.

It should be pointed out that embodiments of the inventive test promotion optimization methods and apparatuses disclosed herein operate on a forward-looking basis in that the plurality of test promotions are generated and tested on segmented subpopulations in advance of the formulation of a general public promotion. In other words, the analysis results from executing the plurality of test promotions on different purposefully segmented subpopulations are employed to generate future general public promotions. In this manner, data regarding the "expected" efficacy of the proposed general public promotion is obtained even before the proposed general public promotion is released to the public. This is one key driver in obtaining highly effective general public promotions at low cost.

Furthermore, the subpopulations can be generated with highly granular segmenting criteria, allowing for control of data noise that may arise due to a number of factors, some of which may be out of the control of the manufacturer or the merchant. This is in contrast to the aggregated data approach of the prior art.

For example, if two different test promotions are executed on two subpopulations shopping at the same merchant on the same date, variations in the response behavior due to time of day or traffic condition are essentially eliminated or substantially minimized in the results (since the time of day or traffic condition would affect the two subpopulations being tested in substantially the same way).

The test promotions themselves may be formulated to isolate specific test promotion variables (such as the aforementioned potato chip brown paper packaging or the 16-oz size packaging). This is also in contrast to the aggregated data approach of the prior art.

Accordingly, individual winning promotion variables may be isolated and combined to result in a more effective promotion campaign in one or more embodiments. Further, the test promotion response data may be analyzed to answer questions related to specific subpopulation attribute(s) or specific test promotion variable(s). With embodiments of the invention, it is now possible to answer, from the test subpopulation response data, questions such as "How deep of a discount is required to increase by 10% the volume of potato chip purchased by buyers who are 18-25 year-old male shopping on a Monday?" or to generate test promotions specifically designed to answer such a question. Such data granularity and analysis result would have been impossible to achieve using the backward-looking, aggregate historical data approach of the prior art.

In one or more embodiments, there is provided a promotional idea module for generating ideas for promotional concepts to test. The promotional idea generation module relies on a series of pre-constructed sentence structures that outline typical promotional constructs. For example, Buy X, get Y for $Z price would be one sentence structure, whereas Get Y for $Z when you buy X would be a second. It's important to differentiate that the consumer call to action in those two examples is materially different, and one cannot assume the promotional response will be the same when using one sentence structure vs. another. The solution is flexible and dynamic, so once X, Y, and Z are identified, multiple valid sentence structures can be tested. Additionally, other variables in the sentence could be changed, such as replacing "buy" with "hurry up and buy" or "act now" or "rush to your local store to find". The solution delivers a platform where multiple products, offers, and different ways of articulating such offers can be easily generated by a lay user. The amount of combinations to test can be infinite. Further, the generation may be automated, saving time and effort in generating promotional concepts.

In one or more embodiments, once a set of concepts is developed, the technology advantageously a) will constrain offers to only test "viable promotions", i.e., those that don't violate local laws, conflict with branding guidelines, lead to unprofitable concepts that wouldn't be practically relevant, can be executed on a retailers' system, etc., and/or b) link to the design of experiments for micro-testing to determine which combinations of variables to test at any given time.

In one or more embodiments, there is provided an offer selection module for enabling a non-technical audience to select viable offers for the purpose of planning traditional promotions (such as general population promotion, for example) outside the test environment. By using filters and advanced consumer-quality graphics, the offer selection module will be constrained to only show top performing concepts from the tests, with production-ready artwork wherever possible. By doing so, the offer selection module renders irrelevant the traditional, Excel-based or heavily numbers-oriented performance reports from traditional analytic tools. The user can have "freedom within a framework" by selecting any of the pre-scanned promotions for inclusion in an offer to the general public, but value is delivered to the retailer or manufacturer because the offers are constrained to only include the best performing concepts. Deviation from the top concepts can be accomplished, but only once the specific changes are run through the testing process and emerge in the offer selection windows.

In an embodiment, it is expressly contemplated that the general population and/or subpopulations may be chosen from social media, site (e.g., Facebook™, Twitter™, Google+™, etc.) participants. Social media offers a large population of active participants and often provide various communication tools, (e.g., email, chat, conversation streams, running posts, etc.) which makes it efficient to offer promotions and to receive responses to the promotions. Various tools and data sources exist to uncover characteristics of social media site members, which characteristics (e.g., age, sex, preferences, attitude about a particular topic, etc.) may be employed as highly granular segmentation criteria, thereby simplifying segmentation planning.

Although grocery stores and other brick-and-mortar businesses are discussed in various examples herein, it is expressly contemplated that embodiments of the invention apply also to online shopping and online advertising/promotion and online members/customers.

These and other features and advantages of embodiments of the invention may be better understood with reference to the figures and discussions that follow.

FIG. 2A shows, in accordance with an embodiment of the invention, a conceptual drawing of the forward-looking promotion optimization method. As shown in FIG. 2A, a plurality of test promotions $102a$, $102b$, $102c$, $102d$, and $102e$ are administered to purposefully segmented subpopulations $104a$, $104b$, $104c$, $104d$, and $104e$ respectively. As mentioned, each of the test promotions ($102a$-$102e$) may be designed to test one or more test promotion variables.

In the example of FIG. 2A, test promotions $102a$-$102d$ are shown testing three test promotion variables X, Y, and Z, which may represent for example the size of the packaging (e.g., 12 oz versus 16 oz), the manner of display (e.g., at the end of the aisle versus on the shelf), and the discount (e.g., 10% off versus 2-for-1). These promotion variables are of course only illustrative and almost any variable involved in producing, packaging, displaying, promoting, discounting, etc. of the packaged product may be deemed a test promotion variable if there is an interest in determining how the consumer would respond to variations of one or more of the test promotion variables. Further, although only a few test promotion variables are shown in the example of FIG. 2A, a test promotion may involve as many or as few of the test promotion variables as desired. For example, test promotion $102e$ is shown testing four test promotion variables (X, Y, Z, and T).

One or more of the test promotion variables may vary from test promotion to test promotion. In the example of FIG. 2A, test promotion $102a$ involves test variable X1 (representing a given value or attribute for test variable X) while test promotion $102b$ involves test variable X2 (representing a different value or attribute for test variable X). A test promotion may vary, relative to another test promotion, one test promotion variable (as can be seen in the comparison between test promotions $102a$ and $102b$) or many of the test promotion variables (as can be seen in the comparison between test promotions $102a$ and $102d$). Also, there are no requirements that all test promotions must have the same number of test promotion variables (as can be seen in the comparison between test promotions $102a$ and $102e$) although for the purpose of validating the effect of a single variable, it may be useful to keep the number and values of other variables (i.e., the control variables) relatively constant from test to test (as can be seen in the comparison between test promotions $102a$ and $102b$).

Generally speaking, the test promotions may be generated using automated test promotion generation software 110, which varies for example the test promotion variables and/or the values of the test promotion variables and/or the number of the test promotion variables to come up with different test promotions.

In the example of FIG. 2A, purposefully segmented subpopulations $104a$-$104d$ are shown segmented using four segmentation criteria A, B, C, D, which may represent for example the age of the consumer, the household income, the zip code, and whether the person is known from past purchasing behavior to be a luxury item buyer or a value item buyer. These segmentation criteria are of course only illustrative and almost any demographics, behavioral, attitudinal, whether self-described, objective, interpolated from data sources (including past purchase or current purchase data), etc. may be used as segmentation criteria if there is an interest in determining how a particular subpopulation would likely respond to a test promotion. Further, although only a few segmentation criteria are shown in connection with subpopulations $104a$-$104d$ in the example of FIG. 2A, segmentation may involve as many or as few of the segmentation criteria as desired. For example, purposefully segmented subpopulation $104e$ is shown segmented using five segmentation criteria (A, B, C, D, and E).

In the present disclosure, a distinction is made between a purposefully segmented subpopulation and a randomly segmented subpopulation. The former denotes a conscious effort to group individuals based on one or more segmentation criteria or attributes. The latter denotes a random grouping for the purpose of forming a group irrespective of the attributes of the individuals. Randomly segmented subpopulations are useful in some cases; however they are distinguishable from purposefully segmented subpopulations when the differences are called out.

One or more of the segmentation criteria may vary from purposefully segmented subpopulation to purposefully segmented subpopulation. In the example of FIG. 2A, purposefully segmented subpopulation 104a involves segmentation criterion value A1 (representing a given attribute or range of attributes for segmentation, criterion A) while purposefully segmented subpopulation 104c involves segmentation criterion value A2 (representing a different attribute or set of attributes for the same segmentation criterion A).

As can be seen, different purposefully segmented subpopulation may have different numbers of individuals. As an example, purposefully segmented subpopulation 104a has four individuals (P1-P4) whereas purposefully segmented subpopulation 104e has six individuals (P17-P22). A purposefully segmented subpopulation may differ from another purposefully segmented subpopulation in the value of a single segmentation criterion (as can be seen in the comparison between purposefully segmented subpopulation 104a and purposefully segmented subpopulation 104c wherein the attribute A changes from A1 to A2) or in the values of many segmentation criteria simultaneously (as can be seen in the comparison between purposefully segmented subpopulation 104a and purposefully segmented subpopulation 104d wherein the values for attributes A, B, C, and D are all different). Two purposefully segmented subpopulations may also be segmented identically (i.e., using the same segmentation criteria and the same values for those criteria) as can be seen in the comparison between purposefully segmented subpopulation 104a and purposefully segmented subpopulation 104b.

Also, there are no requirements that all purposefully segmented subpopulations must be segmental using the same number of segmentation criteria (as can be seen in the comparison between purposefully segmented subpopulation 104a and 104e wherein purposefully segmented subpopulation 104e is segmented using live criteria and purposefully segmented subpopulation 104a is segmented using only four criteria) although for the purpose of validating the effect of a single criterion, it may be useful to keep the number and values of Other segmentation criteria (e.g., the control criteria) relatively constant from purposefully segmented subpopulation to purposefully segmented subpopulation.

Generally speaking, the purposefully segmented subpopulations may be generated using automated segmentation software 112, which varies for example the segmentation criteria and/or the values of the segmentation criteria and/or the number of the segmentation criteria to come up with different purposefully segmented subpopulations.

In one or more embodiments, the test promotions are administered to individual users in the purposefully segmented subpopulations in such a way that the responses of the individual users in that purposefully segmented subpopulation can be recorded for later analysis. As an example, an electronic coupon may fee presented in an individual user's computer-implemented account (e.g., shopping account or loyalty account), or emailed or otherwise transmitted to the smart phone of the individual. In an example, the user may be provided with an electronic coupon on his smart phone that is redeemable at the merchant. In FIG. 2A, this administering is represented by the lines that extend from test promotion 102a to each of individuals P1-P4 in purposefully segmented subpopulation 104a. If the user (such as user P1) makes a promotion-significant response, the response is noted in database 130.

A promotion-significant response is defined as a response that is indicative of some level of interest or disinterest in the goods/service being promoted. In the aforementioned example, if the user P1 redeems the electronic coupon at the store, the redemption is strongly indicative of user P1's interest in the offered goods. However, responses falling short of actual redemption or actual purchase may still be significant for promotion analysis purposes. For example, if the user saves the electronic coupon in his electronic coupon folder on his smart phone, such action may be deemed to indicate a certain level of interest in the promoted goods. As another example, if the user forwards the electronic coupon to his friend or to a social network site, such forwarding may also be deemed to indicate another level of interest in the promoted goods. As another example, if the user quickly moves the coupon to trash, this action may also indicate a level of strong disinterest in the promoted goods. In one or more embodiments, weights may be accorded to various user responses to reflect the level of interest/disinterest associated with the user's responses to a test promotion. For example, actual redemption may be given a weight of 1, whereas saving to an electronic folder would be given a weight of only 0.6 and whereas an immediate deletion of the electronic coupon would be given a weight of −0.5.

Analysis engine 132 represents a software engine for analyzing the consumer responses to the test promotions. Response analysis may employ any analysis technique (including statistical analysis) that may reveal the type and degree of correlation between test promotion variables, subpopulation attributes, and promotion responses. Analysis engine 132 may, for example, ascertain that a certain test promotion variable value (such as 2-for-1 discount) may be more effective than another test promotion variable (such as 25% off) for 32-oz soft drinks if presented as an electronic coupon right before Monday Night Football. Such correlation may be employed to formulate a general population promotion (150) by a general promotion generator software (160). As can be appreciated from this discussion sequence, the optimization is a forward-looking optimization in that the results from test promotions administered in advance to purposefully segmented subpopulations are employed to generate a general promotion to be released to the public at a later date.

In one or more embodiments, the correlations ascertained by analysis engine 132 may be employed to generate additional test promotions (arrows 172, 174, and 176) to administer to the same or a different set of purposefully segmented subpopulations. The iterative testing may be employed to verify the consistency and/or strength of a correlation (by administering the same test promotion to a different purposefully segmented subpopulation or by combining the "winning" test promotion value with other test promotion variables and administering the re-formulated test promotion to the same or a different set of purposefully segmented subpopulations).

In one or more embodiments, a "winning" test promotion value (e.g., 20% off listed price) from one test promotion may be combined with another "winning" test promotion value (e.g., packaged in plain brown paper bags) from another test promotion to generate yet another test promotion. The test promotion that is formed from multiple "winning" test promotion values may be administered to different purposefully segmented subpopulations to ascertain if such combination would elicit even more desirable responses from the test subjects.

Since the purposefully segmented subpopulations are small and may be segmented with highly granular segmentation criteria, a large number of test promotions may be generated (also with highly granular test promotion variables) and a large number of combinations of test promotions/purposefully segmented subpopulations can be executed quickly and at a relatively low cost. The same number of promotions offered as general public promotions would have been prohibitively expensive to implement, and the large number of failed public promotions would have been costly for the manufacturers/retailers. In contrast, if a test promotion fails, the fact that the test promotion was offered to only a small number of consumers in one or more segmented subpopulations would limit the cost of failure. Thus, even if a large number of these test promotions "fail" to elicit the desired responses, the cost of conducting these small test promotions would still be quite small.

In an embodiment, it is envisioned that dozens, hundreds, or even thousands of these test promotions may be administered concurrently or staggered in time to the dozens, hundreds or thousands of segmented subpopulations. Further, the large number of test promotions executed (or iteratively executed) improves the statistical validity of the correlations ascertained by analysis engine. This is because the number of variations in test promotion variable values, subpopulation attributes, etc., can be large, thus yielding rich and granulated result data. The data-rich results enable the analysis engine to generate highly granular correlations between test promotion variables, subpopulation attributes, and type/degree of responses, as well as track changes over time. In turn, these more accurate/granular correlations help improve the probability that a general public promotion created from these correlations would likely elicit the desired response from the general public. It would also, over, time, create promotional profiles for specific categories, brands, retailers, and individual shoppers where, e.g., shopper 1 prefers contests and shopper 2 prefers instant financial savings.

Figure 2B:
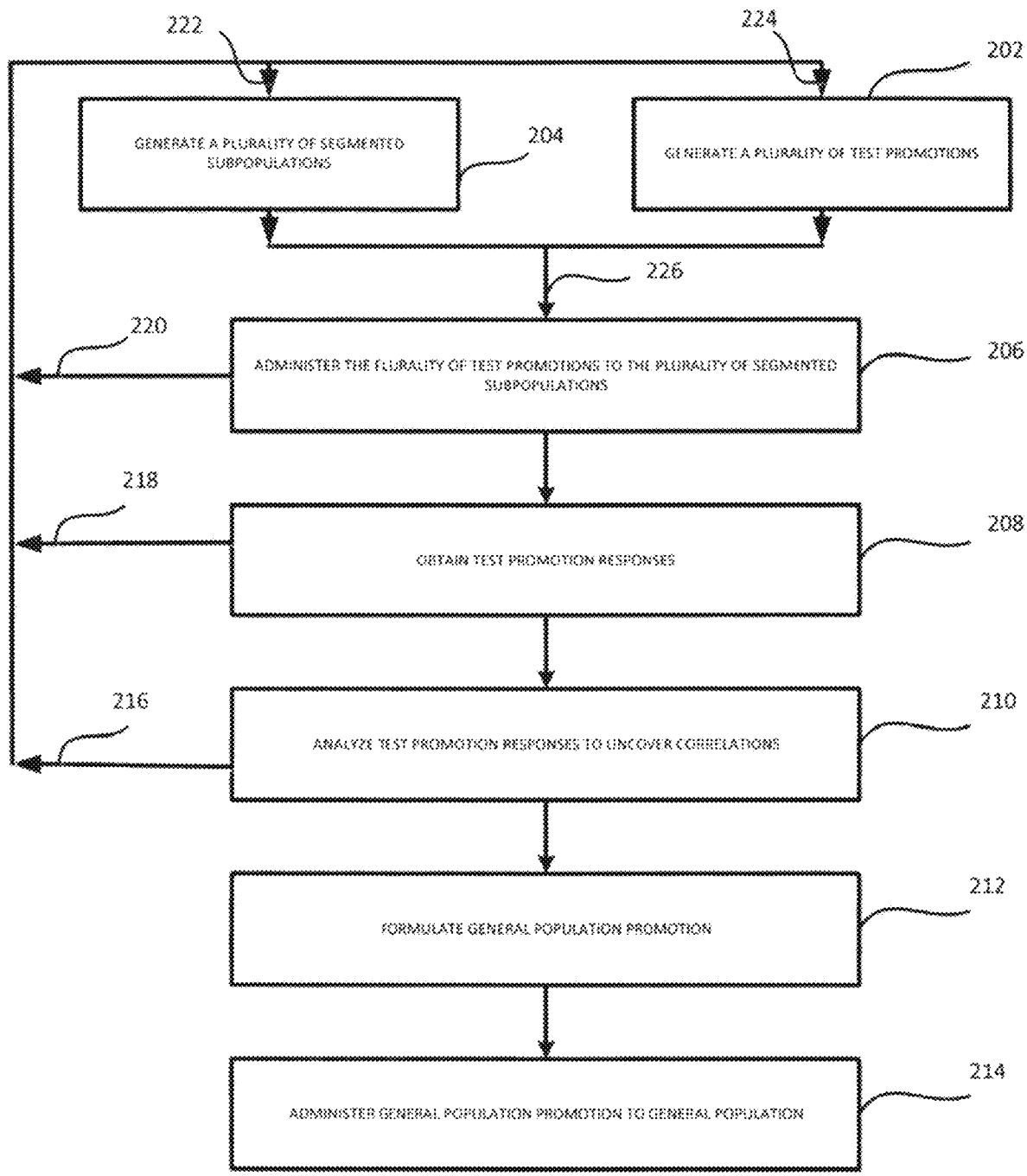
FIG. 2B shows, in accordance with a n embodiment of the invention, the steps for generating a general public promotion.

FIG. 2B shows, in accordance with an embodiment of the invention, the steps for generating a general public promotion. In one or more embodiments, each, some, or all the steps of FIG. 2B may be automated via software to automate the forward-looking promotion optimization process. In step 202, the plurality of test promotions are generated. These test promotions have been discussed in connection with test promotions 102a-102e of FIG. 2A and represent the plurality of actual promotions administered to small purposefully segmented subpopulations to allow the analysis engine to uncover highly accurate/granular correlations between test promotion variables, subpopulation attributes, and type/degree of responses. In an embodiment, these test promotions may be generated using automated test promotion generation software that varies one or more of the test promotion variables, either randomly, according to heuristics, and/or responsive to hypotheses regarding correlations from analysis engine 132 for example.

In step 204, the segmented subpopulations are generated. In an embodiment, the segmented subpopulations represent randomly segmented subpopulations. In another embodiment, the segmented subpopulations represent purposefully segmented subpopulations. In another embodiment, the segmented subpopulations may represent a combination of randomly segmented subpopulations and purposefully segmented subpopulations. In an embodiment, these segmented subpopulations may be generated using automated subpopulation segmentation software that varies one or more of the segmentation criteria, either randomly, according to heuristics, and/or responsive to hypotheses regarding correlations from analysis engine 132, for example.

In step 206, the plurality of test promotions generated in step 202 are administered to the plurality of segmented subpopulations generated in step 204. In an embodiment, the test promotions are administered to individuals within the segmented subpopulation and the individual responses are obtained and recorded in a database (step 208).

In an embodiment, automated test promotion software automatically administers the test promotions to the segmented subpopulations using electronic contact data that may be obtained in advance from, for example, social media sites, a loyalty card program, previous contact with individual consumers, or potential consumer data purchased from a third party, etc. The responses may be obtained at the point of sale terminal, or via a website or program, via social media, or via an app implemented on smart phones used by the individuals, for example.

In step 210, the responses are analyzed to uncover correlations between test promotion variables, subpopulation attributes, and type/degree of responses.

In step 212, the general public promotion is formulated from the correlation data, which is uncovered by the analysis engine from data obtained via subpopulation test promotions. In an embodiment, the general public promotion may be generated automatically using public promotion generation software which utilizes at least the test promotion variables and/or subpopulation segmentation criteria and/or test subject responses and/or the analysis provided by analysts engine 132.

In step 214, the general public promotion is released to the general public to promote the goods/services.

In one or more embodiments, promotion testing using the test promotions on the segmented subpopulations occurs in parallel to the release of a general public promotion and may continue in a continual fashion to validate correlation hypotheses and/or to derive new general public promotions based on the same or different analysis results. If iterative promotion testing involving correlation hypotheses uncovered by analysis engine 132 is desired, the same test promotions or new test promotions may be generated and executed against the same segmented subpopulations or different segmented subpopulations as needed (paths 216/222/226 or 216/224/226 or 216/222/224/226). As mentioned, iterative promotion testing may validate the correlation hypotheses, serve to eliminate "false positives" and/or uncover combinations of test promotion variables that may elicit even more favorable or different responses from the test subjects.

Promotion testing may be performed on an on-going basis using the same or different sets of test promotions on the same or different sets of segmented subpopulations as mentioned (paths 218/222/226 or 218/224/226 or 218/222/224/226 or 220/222/226 or 220/224/226 or 220/222/224/226).

Figure 3A:
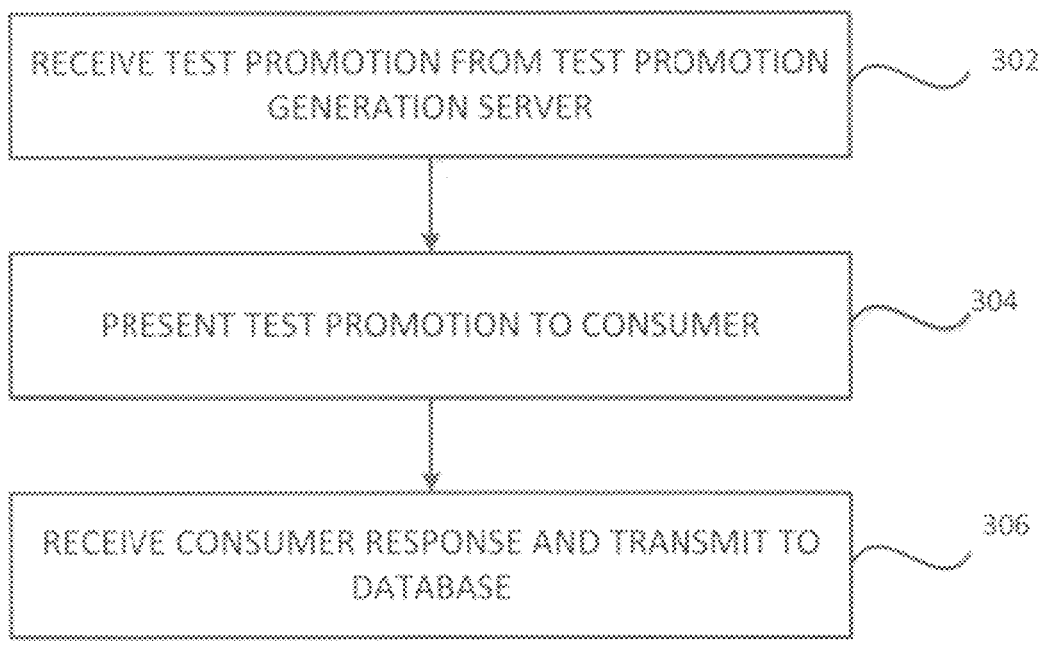
FIG. 3A shows in greater detail, in accordance with an embodiment of the invention, the administering step 206 of FIG. 2 from the user's perspective.

FIG. 3A shows in greater detail, in accordance with an embodiment of the invention, the administering step 206 of FIG. 2 from the user's perspective. In step 302, the test promotion is received from the test promotion generation server (which executes the software employed to generate the test promotion). As examples, the test promotion may be received at a user's smart phone or tablet (such as in the case of an electronic coupon or a discount code, along with the associated promotional information pertaining to the product, place of sale, time of sale, etc.) or in a computer-implemented account (such as a loyalty program account) associated with the user that is a member of the segmented subpopulation to be tested or via one or more social media sites. In step 304, the test promotion is presented to the user. In step 306, the user's response to the test promotion is obtained and transmitted to a database for analysis.

Figure 3B:
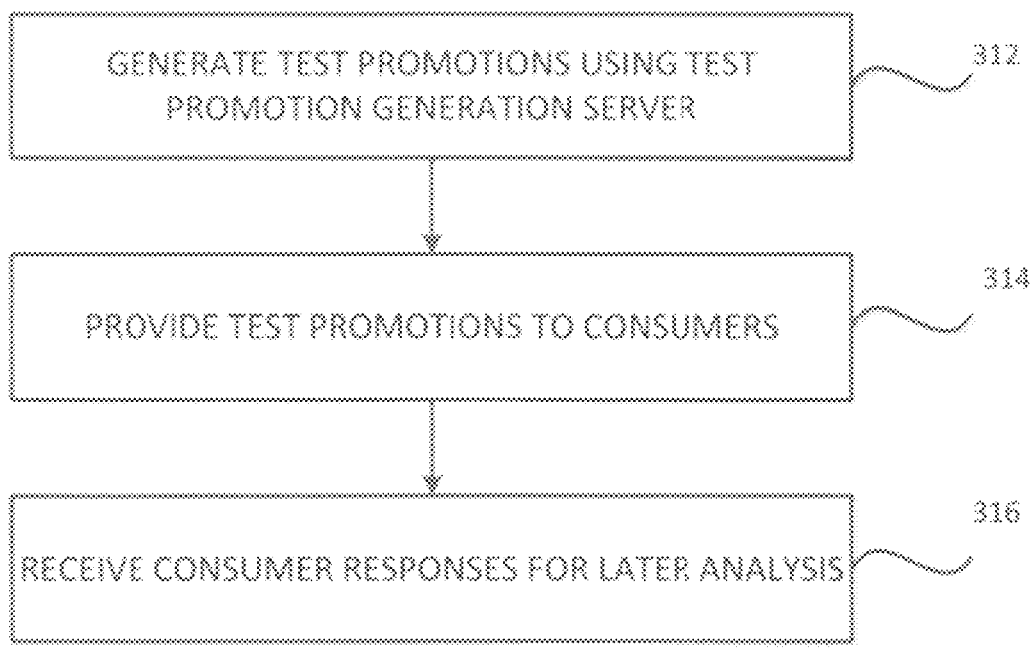
FIG. 3B shows in greater detail, in accordance with an embodiment of the invention, the administering step 206 of FIG. 2 from the forward-looking promotion optimization system perspective.

FIG. 3B shows in greater detail, in accordance with an embodiment of the invention, the administering step 206 of FIG. 2 from the forward-looking promotion optimization system perspective. In step 312, the test promotions are generated using the test promotion generation server (which executes the software employed to generate the test promotion). In step 314, the test promotions are provided to the users (e.g., transmitted or emailed to the user's smart phone or tablet or computer or shared with the user using the user's loyalty account). In step 316, the system receives the user's responses and stores the user's responses in the database for later analysis.

Figure 4:
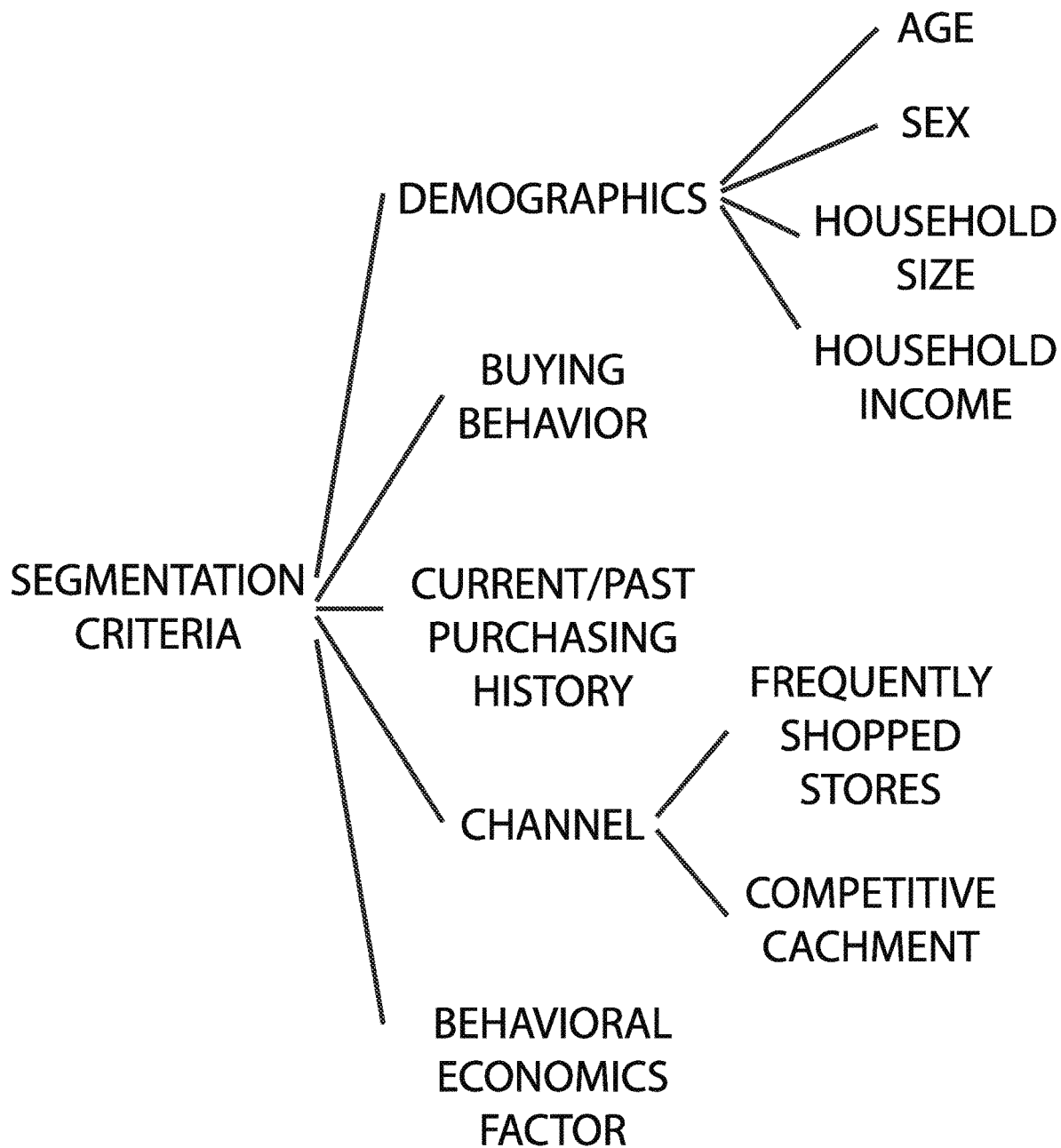
FIG. 4 shows various example segmentation criteria that may be employed to generate the purposefully segmented subpopulations.

FIG. 4 shows various example segmentation criteria that may be employed to generate the purposefully segmented subpopulations. As shown in FIG. 4, demographics criteria (e.g., sex, location, household size, household income, etc.), buying behavior (category purchase index, most frequent shopping hours, value versus premium shopper, etc.), past/current purchase history, channel (e.g., stores frequently shopped at, competitive catchment of stores within driving distance), behavioral economics factors, etc. can all be used to generate with a high degree of granularity the segmented subpopulations. The examples of FIG. 4 are meant to be illustrative and not meant to be exhaustive or limiting. As mentioned, one or more embodiments of the invention generate the segmented subpopulations automatically using automated population segmentation software that generates the segmented subpopulations based on values of segmentation criteria.

Figure 5:
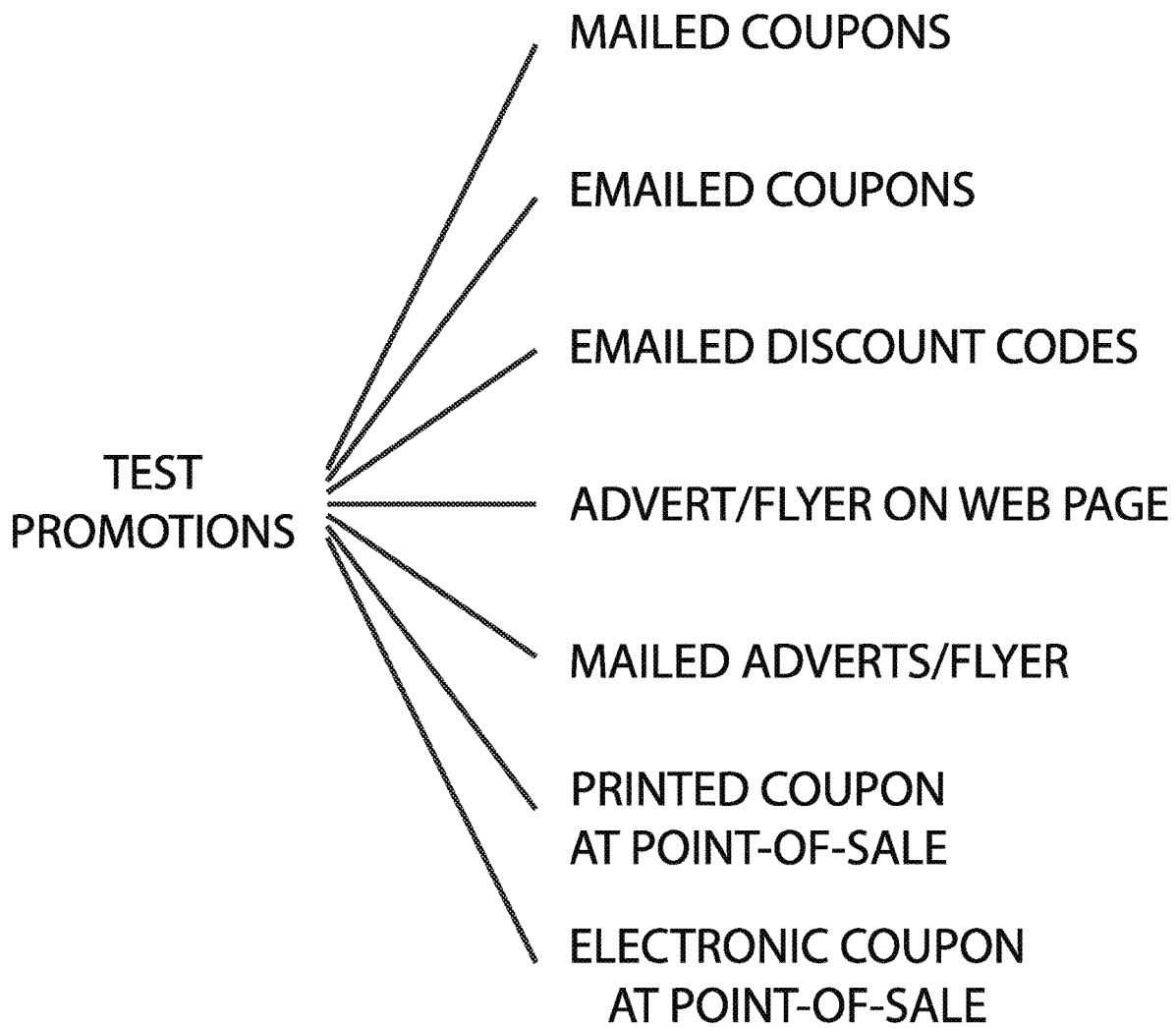
FIG. 5 shows various example methods for communicating the test promotions to individuals of the segmented subpopulations being tested.

FIG. 5 shows various example methods for communicating the test promotions to individuals of the segmented subpopulations being tested. As shown in FIG. 5, the test promotions may be mailed to the individuals, emailed in the form of text or electronic flyer or coupon or discount code, displayed on a webpage when the individual accesses his shopping or loyalty account via a computer or smart phone or tablet. Redemption may take place using, for example, a printed coupon (which may be mailed or may be printed from an electronic version of the coupon) at the point of sale terminal, an electronic version of the coupon (e.g., a screen image or QR code), the verbal providing or manual entry of a discount code into a terminal at the store or at the point of sale. The examples of FIG. 5 are meant to be illustrative and not meant to be exhaustive or limiting. One or more embodiments of the invention automatically communicate the test promotions to individuals in the segmented subpopulations using software that communicates/email/mail/administer the test promotions automatically. In this manner, subpopulation test promotions may be administered automatically, which gives manufacturers and retailers the ability to generate and administer a large number of test promotions with low cost/delay.

Figure 6:
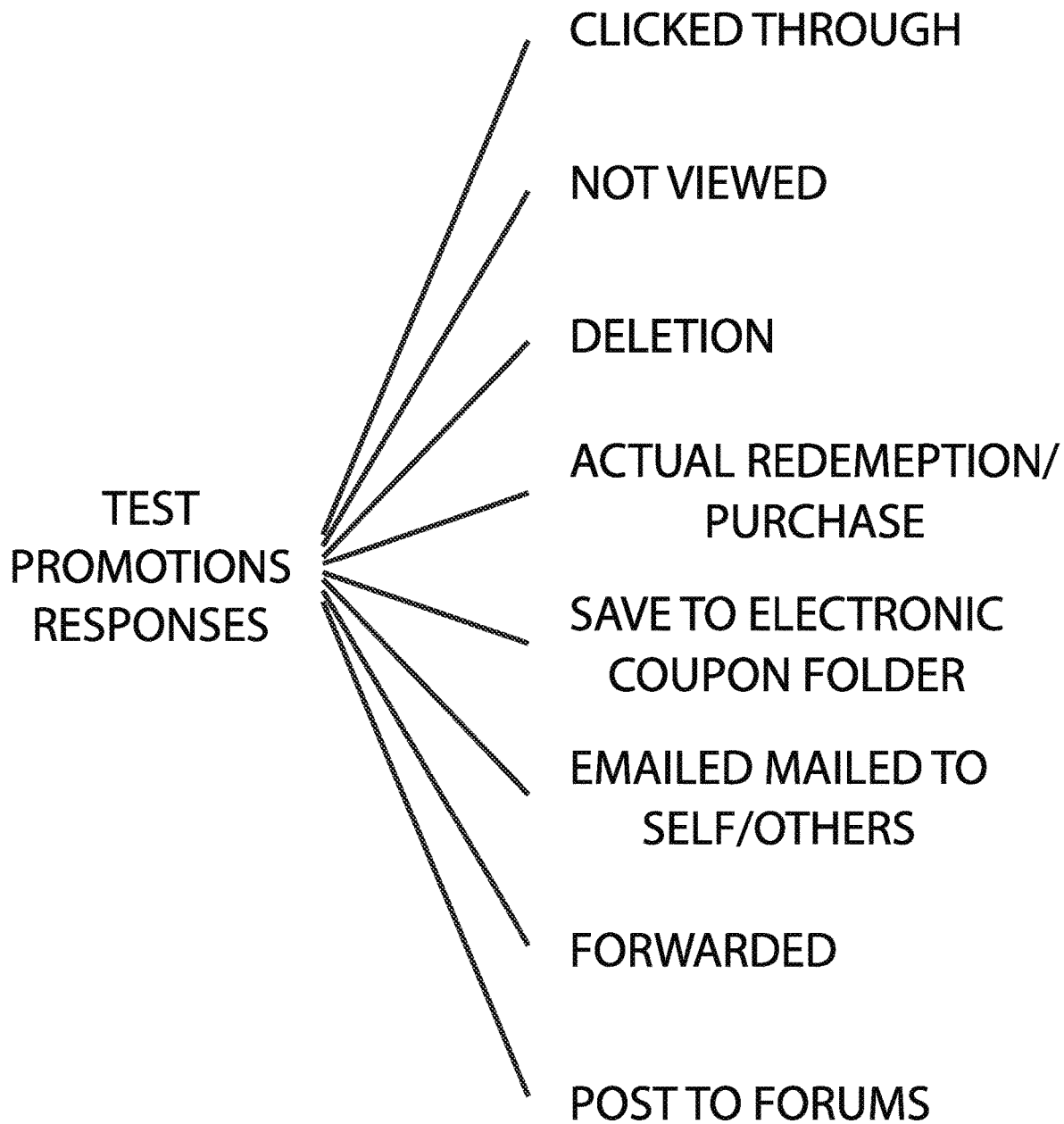
FIG. 6 shows, in accordance with an embodiment, various example promotion-significant responses.

FIG. 6 shows, in accordance with an embodiment, various example promotion-significant responses. As mentioned, redemption of the test offer is one strong indication of interest in the promotion. However, other consumer actions responsive to the receipt of a promotion may also reveal the level of interest/disinterest and may be employed by the analysis engine to ascertain which test promotion variable is likely or unlikely to elicit the desired response. Examples shown in FIG. 6 include redemption (strong interest), deletion of the promotion offer (low interest), save to electronic coupon folder (mild to strong interest), clicked to read further (mild interest), forwarding to self or others or social media sites (mild to strong interest). As mentioned, weights may be accorded to various consumer responses to allow the analysis engine to assign scores and provide user-interest data for use in formulating follow-up test promotions and/or in formulating the general public promotion. The examples of FIG. 6 are meant to be illustrative and not meant to be exhaustive or limiting.

Figure 7:
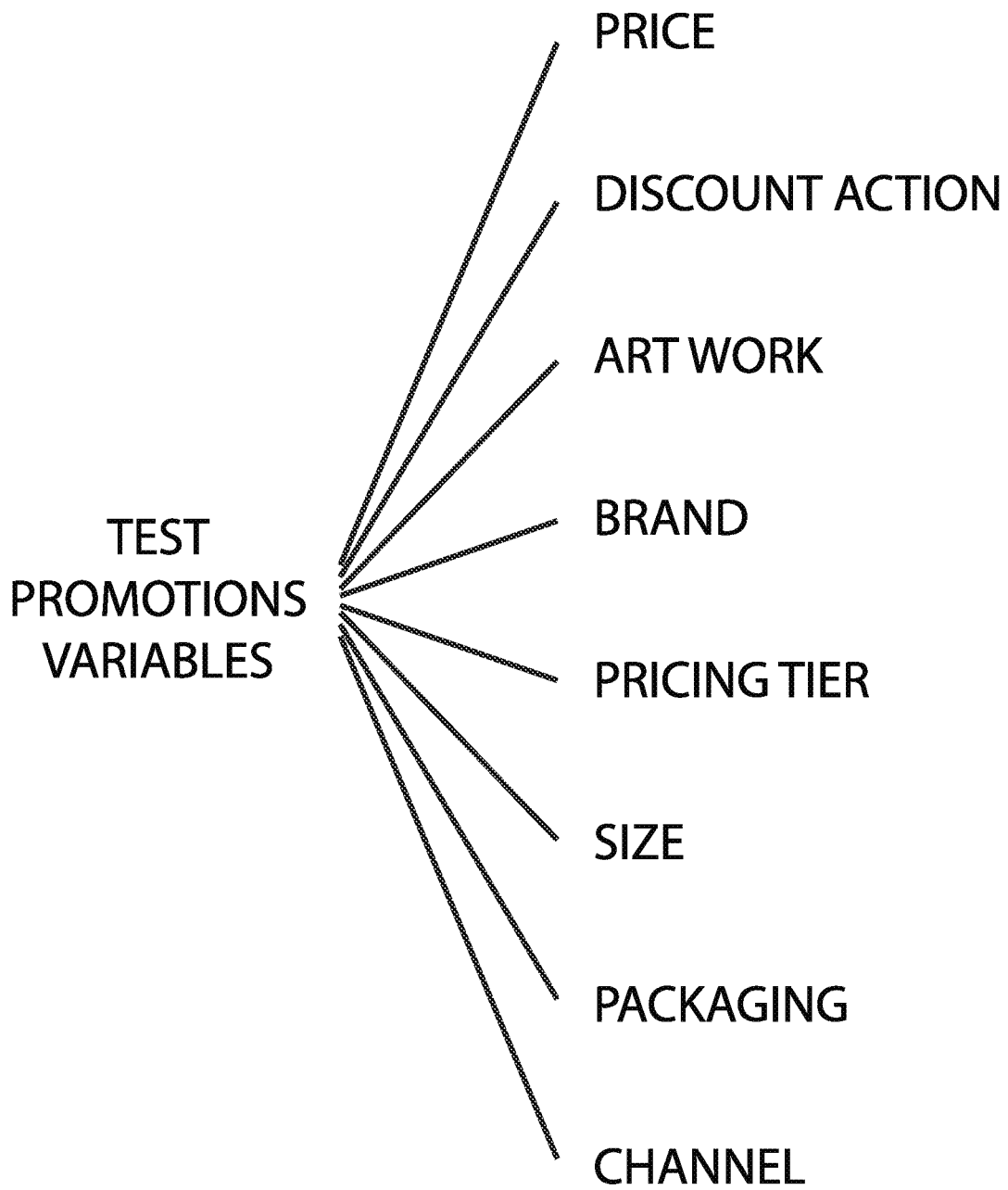
FIG. 7 shows, in accordance with an embodiment of the invention, various example test promotion variables affecting various aspects of a typical test promotion.

FIG. 7 shows, in accordance with an embodiment of the invention, various example test promotion variables affecting various aspects of a typical test promotion. As shown in FIG. 7, example test promotion variables include price, discount action (e.g., save 10%, save $1, 2-for-1 offer, etc.), artwork (e.g., the images used in the test promotion to draw interest), brand (e.g., brand X potato chips versus brand Y potato chips), pricing tier (e.g., premium, value, economy), size (e.g., 32 oz, 16 oz, 8 oz), packaging (e.g., single, 6-pack, 12-pack, paper, can, etc.), channel (e.g., email versus paper coupon versus notification in loyalty account). The examples of FIG. 7 are meant to be illustrative and not meant to be exhaustive or limiting. As mentioned, one or more embodiments of the invention involve generating the test promotions automatically using automated test promotion generation software by varying one or more of the test promotion variables, either randomly or based on feedback from the analysis of other test promotions or from the analysis of the general public promotion.

Figure 8:
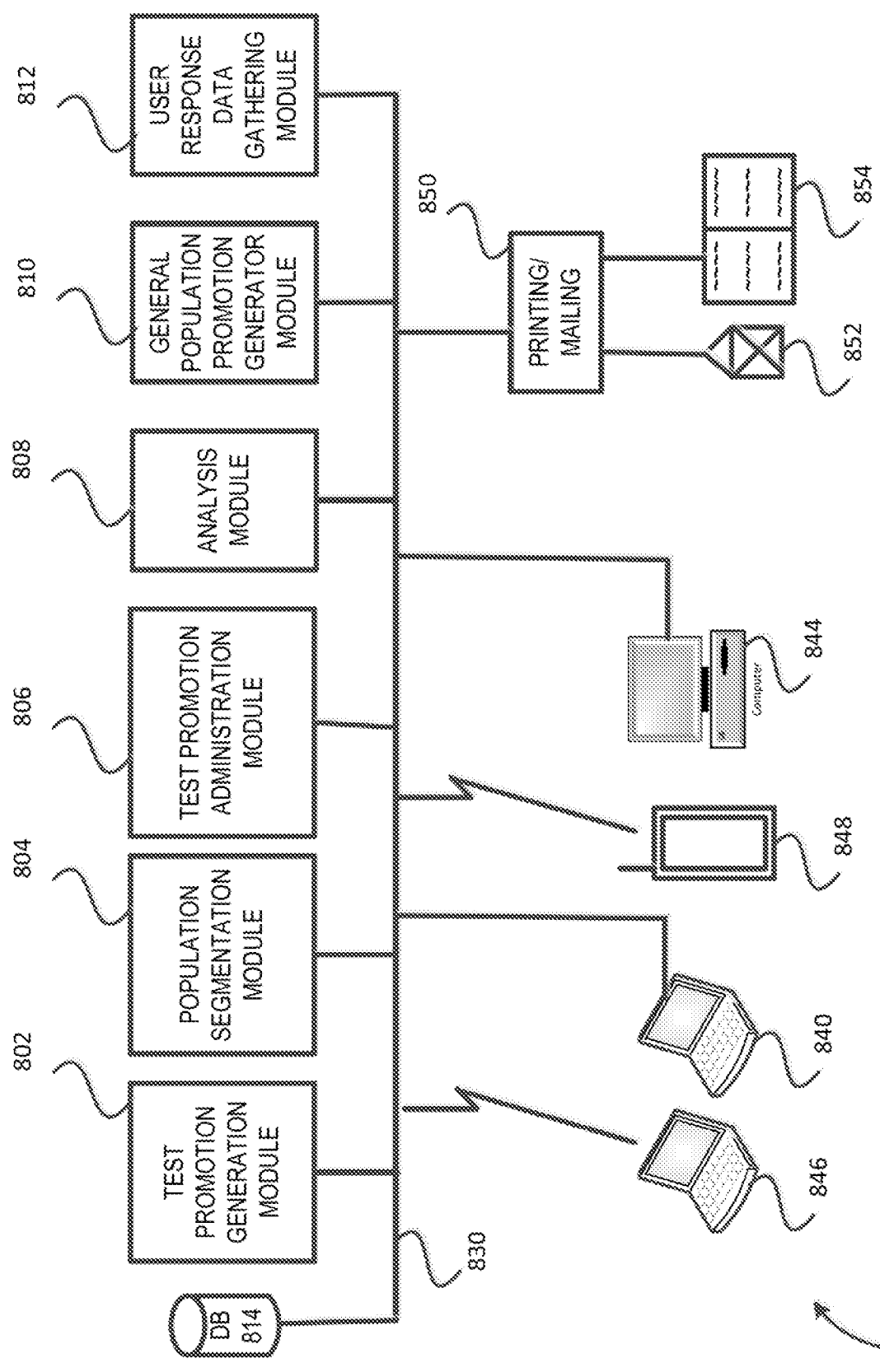
FIG. 8 shows, in accordance with an embodiment of the invention, a general hardware/network view of a forward-looking promotion optimization system.

FIG. 8 shows, in accordance with an embodiment of the invention, a general hardware/network view of the forward-looking promotion optimization system 800. In general, the various functions discussed may be implemented as software modules, which may be implemented in one or more servers (including actual and/or virtual servers). In FIG. 8, there is shown a test promotion generation module 802 for generating the test promotions in accordance with test promotion variables. There is also shown a population segmentation module 804 for generating the segmented subpopulations in accordance with segmentation criteria. There is also shown a test promotion administration module 806 for administering the plurality of test promotions to the plurality of segmented subpopulations. There is also shown an analysis module 808 for analyzing the responses to the test promotions as discussed earlier. There is also shown a general population promotion generation module 810 for generating the general population promotion using the analysis result of the data from the test promotions. There is also shown a module 812, representing the software/hardware module for receiving the responses. Module 812 may represent, for example, the point of sale terminal in a store, a shopping basket on an online shopping website, an app on a smart phone, a webpage displayed on a computer, a social media news feed, etc. where user responses can be received.

One or more of modules 802-812 may be implemented on one or more servers, as mentioned. A database 814 is shown, representing the data store for user data and/or test promotion and/or general public promotion data and/or response data. Database 814 may be implemented by a single database or by multiple databases. The servers and database(s) may be coupled together using a local area network, an intranet, the internet, or any combination thereof (shown by reference number 830).

User interaction for test promotion administration and/or acquiring user responses may take place via one or more of user interaction devices. Examples of such user interaction devices are wired laptop 840, wired computer 844, wireless laptop 846, wireless smart phone or tablet 848. Test promotions may also be administered via printing/mailing module 850, which communicates the test promotions to the users via mailings 852 or printed circular 854. The example components of FIG. 8 are only illustrative and are not meant to be limiting of the scope of the invention. The general public promotion, once generated, may also be communicated to the public using some or all of the user interaction devices/methods discussed herein.

Generally speaking, test promotions (or generalized public promotions) are presented to consumers as offers. These offers are often online offers and may take the form of, for example, digital coupons or click-through advertisements to be presented on a webpage, mobile app, text/display ads, digital coupons, digital billboard, print-at-home coupon, digital wallet, etc.

In the prior art, the process of creating offers has been largely manual. Generally speaking, the manufacturer of a product or a service provider wishing to make the promotion offer to the public needs to manually type in the promotional text and manually lay out the graphics in a format dictated by the specific platform on which the offer is published. For example, if the product is Pepsi™ and the platform is a social media site such as Facebook™, the manufacturer must comply with the layout guidelines regarding background color, foreground color, font size, character limit, margins, type of graphics, etc. of that platform Facebook™. Similarly, if the platform is a mobile device (such as a smart phone), the manufacturer must comply with the layout guidelines of the service provider associated with mobile device. The offer is then manually loaded or transferred onto the platform for presenting to the consumer.

In essence, every promotional offer needs to be manually created and tailored to the guidelines of the particular platform on which the offer is presented. If an existing offer needs to be revised, the whole process needs to be followed again. For example, if the manufacturer wishes to offer three different types of discount (e.g., 5% off, 10% off, and buy-one-get-one-free) for a particular type of soft drink and these offers need to be presented on three different platforms, nine different variations of the offer must be manually created to encapsulate the different offered discounts and to fit the requirements of the various platforms.

The manual, labor-intensive, and time-consuming manner with which promotional offers are created in the prior art presents a problem with respect to scalability. Since promotional testing may require iterating through thousands and possibly millions of different offers encapsulating different possible combinations of variable values, requiring each offer to be manually created and then tailored to the various specific platforms on which these test promotions are published may take an unduly long amount of time or may be simply too expensive to do.

Further, the burden imposed on the promotion creator to conform to layout guidelines hampers the creativity process since promotion creators now must be pre-occupied with platform-specific concerns instead of focusing on the promotion content creation process. Still further the manual, labor-intensive, and time-consuming manner with which promotional offers are created in the prior art limits creative exploration since it may simply be too expensive or time consuming to generate a large number of creative, never-tried-before promotional offers in the pursuit of what-ifs.

One or more embodiments of the invention relate to methods and apparatus for automatically generating offers to be presented on appropriate platforms from templates provided by the system and variable values acquired during the creation phase. A concept generator combination module then produces various combinations of values for the variables of the offer to create a large number of offers. An offer validation module receives the combinations produced by the concept generator combination module and performs validation.

Platform validation ensures that the produced offer conforms to the requirements of the platform on which the offer is intended to be displayed. These requirements may include for example, font color, font size, any restriction on graphics, any text field limitation, etc. Product validation ensures that the right product is offered with the right packaging, description, quantity, etc. Discount validation ensures that the type of discount offered is accurate and does not violate common sense rules (such as discounting a product so much that it becomes free or actually costs the manufacturer money when the promotion coupon is redeemed). These are only examples and are not intended to be exhaustive or limiting.

Figure 9:
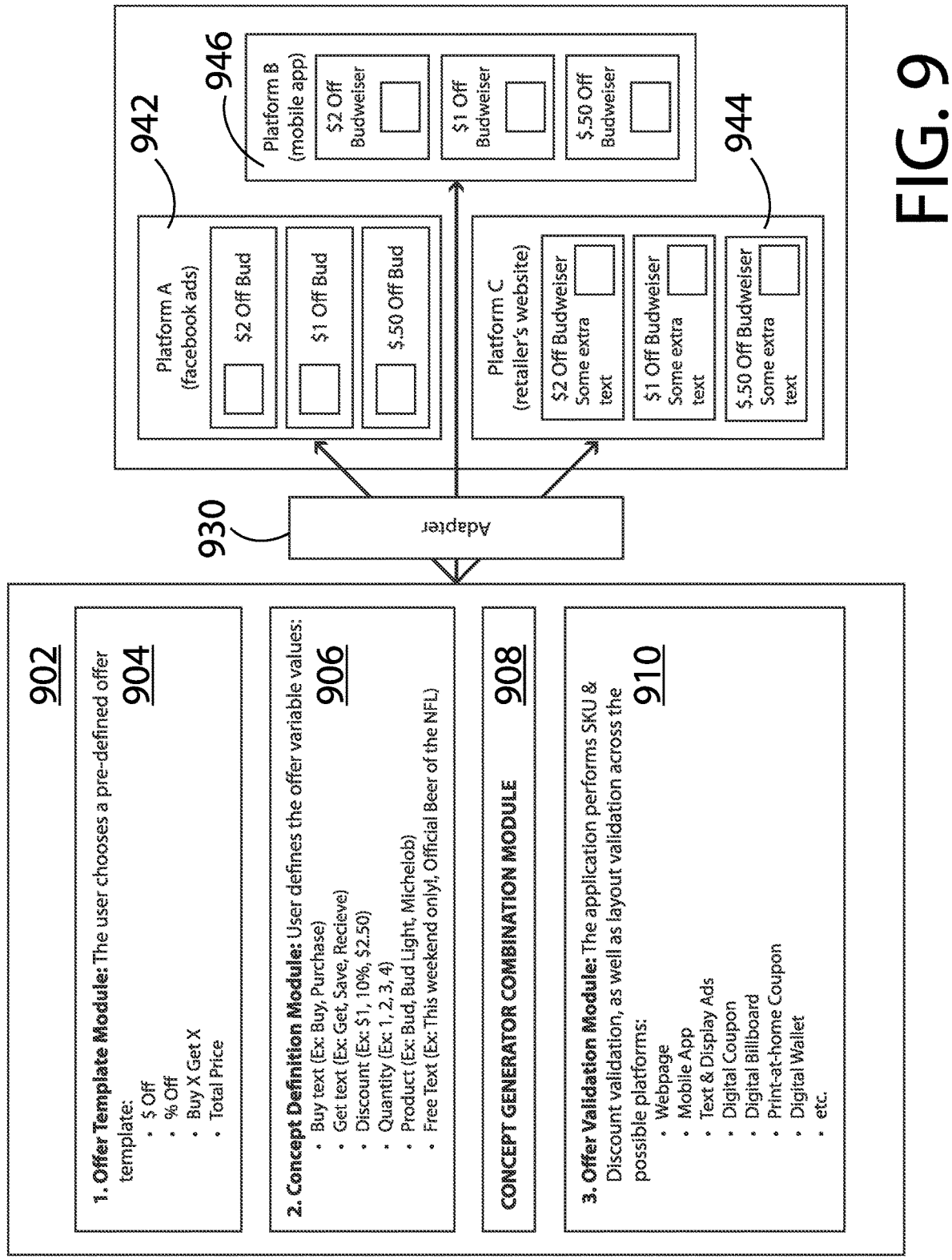
FIG. 9 shows, in accordance with an embodiment of the invention, an example concept generator 902, which includes four main modules: offer template module 904, concept definition module 906, concept generator combination module 908, and offer validation module 910.

FIG. 9 shows, in accordance with an embodiment of the invention, an example concept generator 902, winch includes four main modules: offer template module 904, concept definition module 906, concept generator combination module 908, and offer validation module 910.

Offer template module 904 represents the module that offers to the user various templates implementing various promotion themes. These themes may include a certain amount off ("$ off"), a certain percentage off ("% Off"), buy something get something else for free or for reduced cost ("Buy X Get Y"), or simply the price of a product of service. Each template may have multiple layout options, representing different looks for example, for the user to pick from, if desired. Further, the user can select to have the system recommend templates around a theme that the user wishes to implement (e.g., Christmas % Off) and promotion templates pertaining to Christmas in look-and-feel with the % Off theme would be presented to the user for further operation. These are only examples and are not intended to be exhaustive or limiting.

Concept definition module 906 represents, on one embodiment, the module allowing the user to enter promotional variable values into the template(s) chosen in step 904. In an embodiment, promotional variable values represent the values that will be combined in various permutations to be offered to the user as test promotions. These values will be tested in the test promotions to determine which value or combination of values would have the greatest impact on the promotion goal if offered in a generalized public promotion.

Alternatively, the data values may be provided as a file from some other module that is responsible for variable value selection for the test promotions. In this case, concept definition module 906 represents the module for receiving such value definition file. Alternatively, concept definition module 906 may represent a user interface facility for allowing the user to enter values into the variable fields of the template.

For example, in the "Buy text" variable field of the template, the choices representing values available to the user may be "Buy" or "Purchase". As another example, in the "Get text" variable field of the template, the choices representing values available to the user may be "Get" or "Save" or "Receive". As another example, in the "Discount" variable field of the template, the choices representing values available to the user may be "$1" or "10%" or "$2.50". As another example, in the "Quantity" variable field of the template, the choices representing values available to the user may be "1" or "2" or "3" or "4".

As another example, in the "Product" variable field of the template, the choices representing values available to the user may be "Bud" or "Bud Light" or "Michelob". Other attributes (e.g., type of packaging, quantity per selling unit, etc.) may also be specified in the product variable field. As another example, in the "Free text" variable field of the template, the choices representing values available to the user may be "This weekend only!" or "Official Beer of the NFL". The "Free Text" variable field may represent the field to insert statements tailored to the desired behavioral economies principle "e.g., affinity". These are only examples and are not intended to be exhaustive or limiting.

In one or more embodiments, the user may employ concept definition module 906 to also specify the platform (s) on which the promotion offers will be manifested. Alternatively, platform specification may be specified in the offer template module phase or in the concept generator combination phase (to be discussed below) or in the offer validation module phase prior to platform validation.

Concept generator combination module 908 represents the module for iteratively forming various permutations of variable values from the values acquired by the concept definition module 906. These value permutations are then inserted into the template(s) selected by the user via the offer template module 904 to generate the set of test promotion offers.

Prior to sending the test promotion offers to the platform, offer validation module 910 performs various types of validation on the test promotions generated by the concept generator combination module 908. Product validation may include validating the type of product offered, the brand, the quantity, the packaging, etc. for example, if a certain soft drink manufacturer only makes 30-pack in cans only and not bottle, validation would prevent the offer of a 30-pack of this soft drink in bottles.

Discount validation is another type of validation that may be performed. Discount validation ensures that the discount is of the type appropriate, and the discount does not violate certain business rules such as the discount cannot be larger than the sale price of the product or the difference between the product price and the discount price cannot fall below a certain threshold.

Platform validation ensures that the generated promotional offers conform to the requirements (e.g., layout, graphics size, character count, look-and-feel or any other constraints) imposed by the platform. These platforms may include, for example, webpage, mobile app, text/display ads, digital coupons, digital billboard, print-at-home coupon, digital wallet, etc. Other types of validations may also be performed. Generally speaking, any kind of business rules may be imposed, and validation against those business rules may take place via offer validation module 910.

Validation may be based on any desired criteria, including for example any business rules imposed by the entity wishing to offer the promotion or those imposed by the designer.

Platform adapter 930 takes in the promotional offers that have been validated by offer validation module 910 and adapts them to the various platforms. Such adaptation may include adapting the offers to the transport requirement to properly transmit the offers to the platform, formatting the offers to fit the display or publishing requirements of the platforms, etc.

Every permutation may be automatically generated into offers and adapted for displaying/publishing to the various desired platforms. Example platforms include social media advertising (942), a coupon on a retailer's website (944), and a digital coupon on a mobile app (946). These are only examples and are not intended to be exhaustive or limiting.

In this manner, adapting the offers to the specific platforms is modularized such that the promotion designers are free from the burden of having to be concerned with the specific requirements of the various platforms. Further, if the platform imposes a change as to how the offer is to be presented, this change can be made in with the file employed by the adapter to perform the adaptation, and any additional offers generated are automatically adapted to the new requirements.

FIG. 10 shows, in greater detail and in accordance with an embodiment of the invention, example options that may be selected by the user via offer template module 904. If the user chooses the "$ Off" template, additional options may include the options shown by reference number 1002. If the user chooses the "% Off" template, additional options may include the options shown by reference number 1004. If the user chooses the "Free template" template (e.g., buy something, get something), additional options may include the options shown by reference number 1006. If the user chooses the "total price" template, additional options may include the options shown by reference number 1008.

The user may also have the option of taking an existing template and modify to add or remove variables, to change format (e.g., font size, foreground color, background color, margin), layout (e.g., where to place text and graphics and how to rearrange items so they appear visually as desired in the promotional offer). The user may then save the modified template for use immediately or in the future. Again, these are only examples and are not intended to be exhaustive or limiting.

Figure 11:
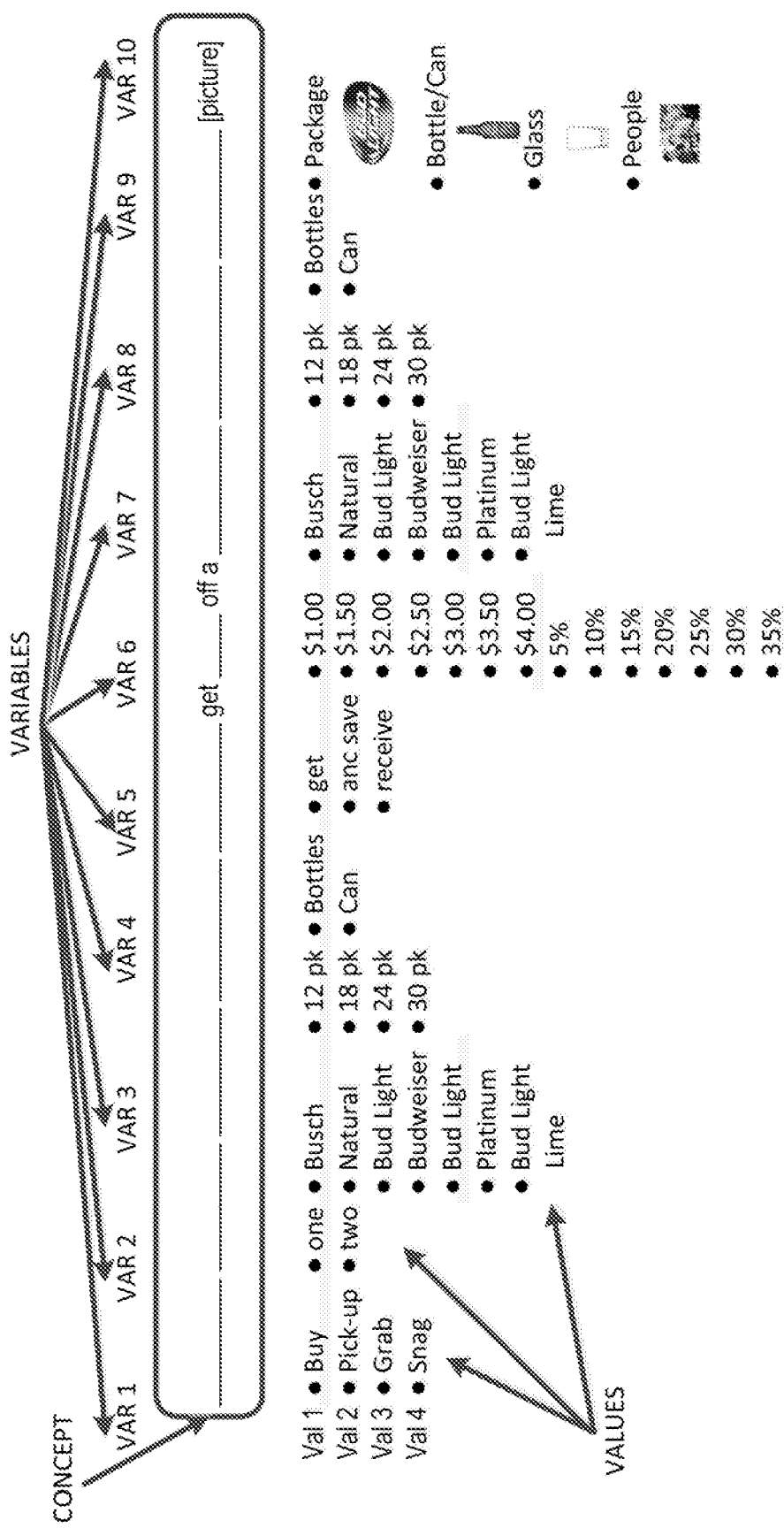
FIG. 11 shows, in accordance with an embodiment, the various values that may be employed in a hybrid template that can offer either "$ Off" or "% Off".

FIG. 11 shows, in accordance with an embodiment, the various values that may be employed in a hybrid template that can offer either "$ Off" or "% Off". Each of variables "Var 1" to "Var 10" has associated values that have been selected by the user (or some selection algorithm) for use in test promotions. For example "Var 1" represents the action word urging the consumer to do something and has four associated values: "Buy" "Pickup" "Grab" and "Snag". Var 2 represents the quantity to be promoted and has two values: "one" or "two". Var 3 represents the product to be promoted, and has the values shown below Var 3 in FIG. 11: "Busch" to "Bud Light Lime". Var 10 represents the graphics and includes four options shown. Again, these are only examples and are not intended to be exhaustive or limiting.

If all combinations are to be included in the set of test promotions, a possible of 4×2×6×4×2×14×6×4×2×4 or 1,032,192 possible promotion offers are possible for this example. If the example needs to be promoted on three platforms, the total number of promotions would be 1,032,192×3 or 3,096,576. The generation of these combinations may be performed automatically using the concept generator combination module 908 of FIG. 9, for example. Without the type of automation offered by embodiments of the invention, manually creating these millions of promotion offers for the different platforms would have been impossible to do in a reasonable amount of time and/or within a reasonable budget.

Figure 12:
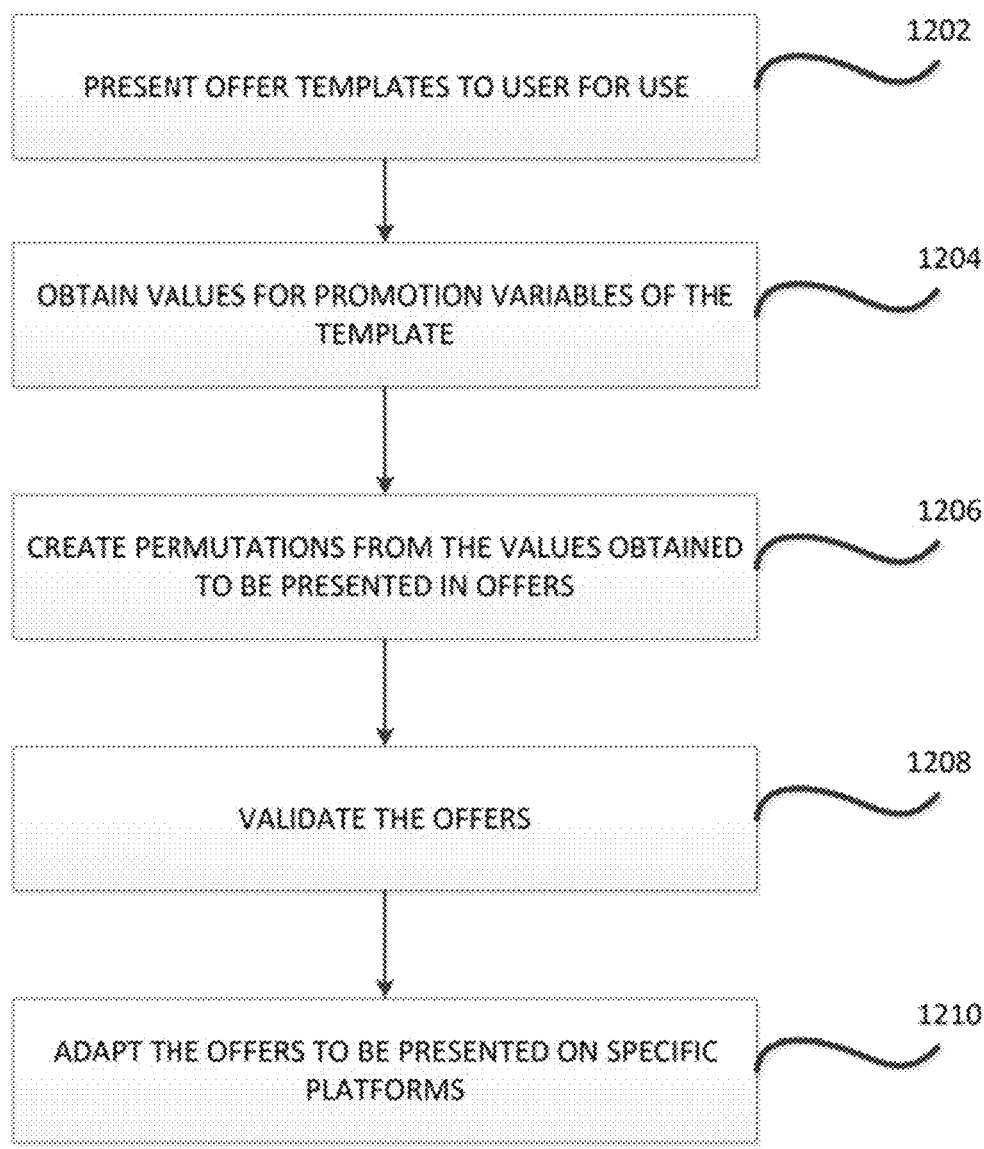
FIG. 12 shows, in accordance with an embodiment, the software-implemented steps for automatically generating promotional offers.

FIG. 12 shows, in accordance with an embodiment, the software-implemented steps for automatically generating promotional offers. In step 1202, the offer templates are presented to the user for selection. The selection of a template may depend on the theme of the promotion (e.g., $ Off, % Off, buy-one-get-one-free, etc.). The user can drill down and obtain more specific templates within such theme (e.g., one of choices 1002 of FIG. 10).

In step 1204, the values are obtained for the variables of the chosen template. The values may be furnished in a file if the values are selected by some intelligent selection algorithm, for example. As another example, the user may directly enter the values into a user interface associated with a concept definition module, such as module 906 of FIG. 9.

In step 1206, various permutations are created for the values acquired in step 1204 for the variables of the template selected in step 1202. The permutations of these values are then validated in step 1208. Various types of validation are possible including product validation, discount validation, platform validation. Examples of these validations have been discussed in connection with the offer validation module 910 of FIG. 9.

Thereafter, the validated offers may be adapted to be presented by the various platforms (1210). Some example adaptations have been discussed in connection with platform adapter 930 of FIG. 9. The result is the set of promotional offers that contain all desired permutations, that have been validated, and that are adapted for presentation on specific platforms. All these tasks take place automatically in accordance with embodiments of the invention.

As can be appreciated by the foregoing, embodiments of the invention enable the automatic creation of a large number of promotional offers in a manner that eliminates the manual and time-consuming process of promotion creation of the prior art. Further, the offers generated are automatically adapted to the platforms, freeing the promotion designer to explore in the offer creation process without worrying about platform-specific issues and without the bottleneck imposed by manual, time-consuming methods of the prior art.

Further, intelligent product validation prevents inaccuracy in product details when generating an offer from a permutation of values and prevents the accidental publishing of an offer with a product that is either inappropriate or does not exist, for example. Still further intelligent discount validation prevents an offer from including a discount that is inappropriate (e.g., the discount amount is larger than the price of the product).

Still further, the elimination of human involvement in the offer creation process removes human-induced variations in the offers. For example, if two offers only differ in the values of a single variable and the two offers are consistent with respect to all other variables and layout, systemizing the offer creation process ensures that the offers presented to consumers are different only because of the difference in the values and not because of any human-induced inconsistency. This systemizing aspect allows more accurate comparison of results and more accurate insight to be obtained regarding the contribution of each individual value. In turn, this allows a more accurate and result effective recommendation to be formed regarding the generalized public promotion.

In one or more aspects of the invention, the inventors herein realize that social media represents a uniquely suitable arrangement for forward-looking promotion testing in which different online promotions are actually offered to subpopulations and actual responses are recorded and analyzed in order to obtain insights for use in formulating the generalized public promotion (which may be online, brick-and-mortar, or print promotion). Social media (such as Facebook™, Google+™ and the Google™ ecosystem, Twitter™, etc.) are unique in that a large amount of very personalized and/or time-dependent information is available in ways that have not been available in any other medium.

For example, most social media websites require registration, which process associates the human user with a unique userid and also gathers some basic demographic (e.g., age, sex, city) regarding the user. That userid is then used each time the human user posts information, clicks on links, forms groups of friends, performs searches, participates in discussions, downloads documents, music, or videos, makes purchases, reads news or other information, etc.

Each of these activities furnishes information about the user. For example, posts made by the user can be analyzed for mentions of products, for hobbies (e.g., photography, tennis, travel). Links clicked by the user can be analyzed with respect to content and frequency, for example, to determine the user's interests. Friends and their personal information (e.g., age group, music listened to) can be analyzed to gain insights into the user. Search key words can be analyzed to determine the user's interest, etc.

Social media websites also are rich with non-personal information, such as news, current events, etc., all of which can affect the user's state of mind and possibly his interest in products or services.

Equally importantly, all these activities have been tracked with respect to time. With the time component, it is possible to gain insights not only into the user's interest but also when or for how long the user has such interest.

Still further, these activities can also be tracked with respect to location. With the location component, it is possible to also know where the user was when the user has such interest, for example.

The inventors herein realize that the vast quantity of data of very personalized data acquired by social media sites with respect to its users provides heretofore unequaled opportunities for segmenting the user population for the purpose of forward-looking automated online promotion testing and for analyzing the promotion testing result.

In accordance with embodiments of the invention, there are provided techniques for automated, forward-looking online promotion testing utilizing social media data. In one or more embodiments, the plurality of online test promotions are automatically generated from promotion parameter values entered via a user-friendly interface. The online test promotions are then automatically administered to groups of users of a social media website, and responses are automatically recorded. In this testing phase, the groups of users to whom the online test promotions are administered may be automatically selected based on personalized social media data of the users and/or non-personalized data.

Alternatively or additionally, in the analysis phase, the test promotions may be grouped in various ways in accordance with personalized social media data of the participating users and/or non-personalized data in order to gain insights into the performance of each test promotion and each variable value that makes up the test promotion with respect to a particular indicator or for a group of indicators.

As the terms are employed herein, personalized social media data refers to data that is associated with a particular social media site user. Examples of personalized social media data include, for example and not meant to be exhaustive, the user's demographic data, the user's friends, the contents of the user's posts, the user's search key words, the links clicked on by the user in the past, the user's download or purchase history, the user location and/or time when the test promotion is administered or at any particular time duration of interest, etc.

Non-personalized data refers to data that is not associated with any particular user. Examples of non-personalized data include, for example and not meant to be exhaustive, political events, economic or stock information, weather, sports events, etc.

An indicator, as the term is employed herein, can be an item of personalized social media data (such as the user's age group or the location of the user) or an item of non-personalized data (such as whether the national unemployment rate is above or below 5% the month during which the test promotions are administered).

For example, the test promotion recipients or results can be grouped according to an indicator or a group of indicators. For example, the test promotion recipients or results can be grouped in accordance with the age group of the participating users (example of a single indicator which is a personalized social media data item). As another example, the test promotion recipients or results can be grouped in accordance with the age group of the participating users and whether the user is interested in tennis (example of a group of indicators which comprises of a plurality of personalized social media data items).

As another example, the test promotion recipients or results can be grouped in accordance to the seasons during which the test promotions are administered (example of a single indicator which is a non-personalized data item). As another example, the test promotion recipients or results can be grouped in accordance to the seasons during which the test promotions are administered and whether the national unemployment rate is above 5% (example of a group of indicators which comprises of a plurality of non-personalized data items).

As another example, the test promotion recipients or results can be grouped for users who are 30-40 years old and for test promotions administered during the summer months (example of a group of indicators which is a mix of personalized social media data items and non-personalized data items).

The indicator-based segmentation can be done prior to promotion testing such that users can be pre-selected based on these indicators. Alternatively or additionally, the indicator-based segmentation may be performed after promotion testing such that analysis may be performed based on test promotions (and their associated results) grouped in accordance with these indicators.

The features and advantages of embodiments of the invention may be better understood with reference to the figures and discussion that follow.

Figure 13:
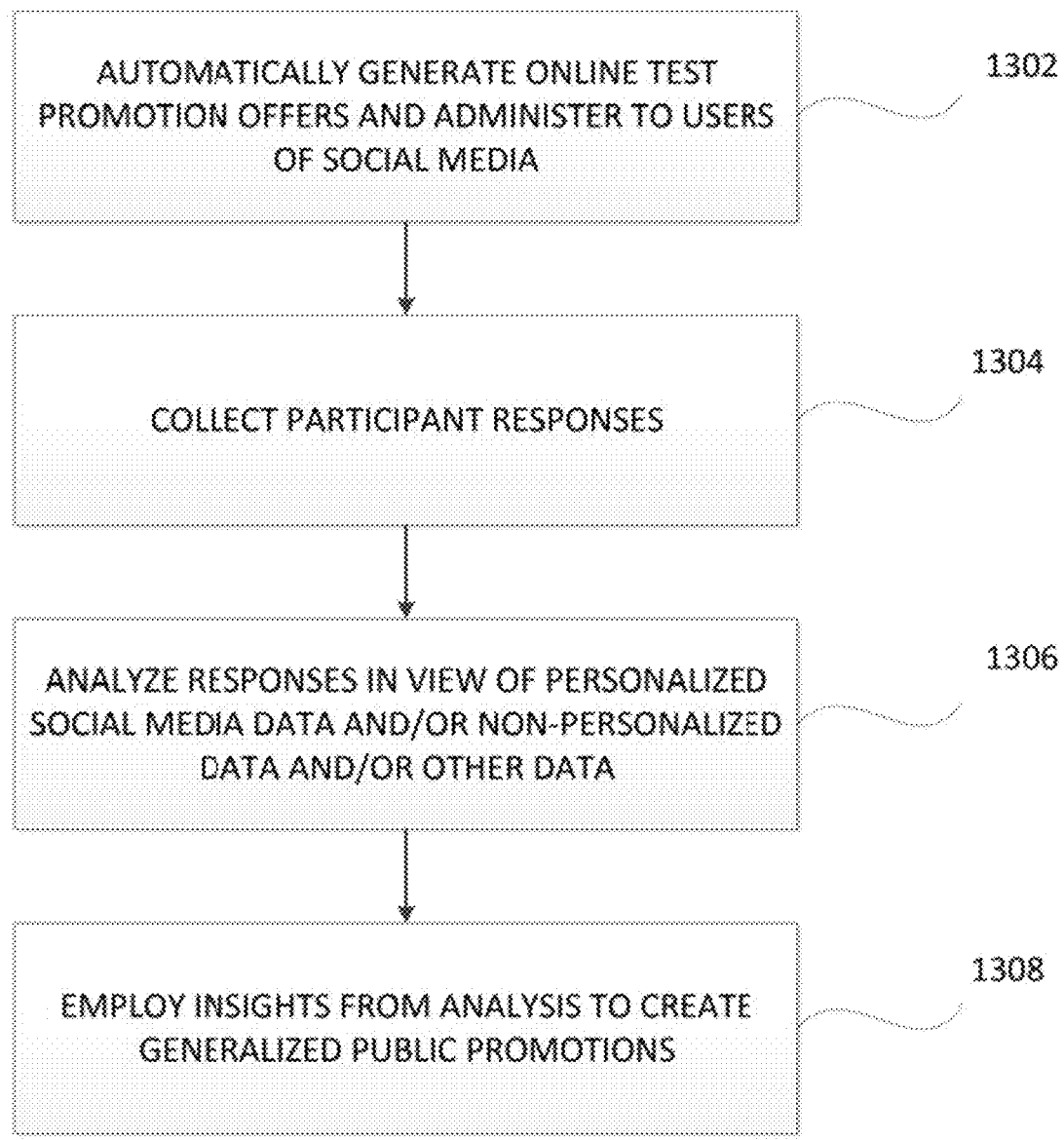
FIG. 13 shows, in accordance with an embodiment of the invention, the steps for performing automated, forward-looking online promotion testing utilizing social media data.

FIG. 13 shows, in accordance with an embodiment of the invention, the steps for performing automated, forward-looking online promotion testing utilizing social media data. In step 1302, the offers are automatically generated and administered to the social media users. As mentioned above in connection with the concept generator, a larger number of offers can be automatically generated efficiently. In an embodiment, the user interface employed to enter the test promotion parameter values may be tailored to the needs and/or look-and-feel and/or requirements of a particular social media platform.

The social media subpopulations to whom the online promotional offers are administered may be selected based on personalized and/or non-personalized indicators in an embodiment. In another embodiment, the subpopulations to whom the online promotional offers are administered may be randomly selected. In one or more embodiments, the online promotional offers are made on the social media platform (e.g., such as on the social media site personalized page of the participant) such that the online promotional offer may be perceived by the participant as a part of the social media experience.

In step 1304, the participants' responses are collected. For example, a module may monitor whether a participant looks at the coupon (using eye tracking sensor, for example), whether the participant clicks on the coupon (e.g., click-through), whether the participant actually redeems the coupon at a later date, etc. Response data from all the participants or a subset thereof may be recorded for later analysis.

In step 1306, the participants' responses are analyzed in view of the personalized and/or non-personalized indicators to gain insights into promotion response behavior. The participants' responses may be grouped in accordance with one or more personalized social media data indicators (e.g., age of participant, income, friends, what type of friends, what the friends are interested in) and/or with one or more non-personalized indicators (e.g., whether the local football team is playing, whether the season is summer or winter, whether the promotion is administered during a holiday or a workday, etc.).

In one or more embodiments, interests or attitudes or other attributes of the participants may be analyzed based on their "chatter" (such as social media posts) and employed as indicators. The personalized and interactive nature of social media allows this type of analysis of online promotion testing based on chatter-based indicators (e.g., response behavior with respect to the online promotion based on whether a given participant is interested in tennis based on the content of the comments or pictures posted by the participant). This is a powerful feature of embodiments of the invention.

In one or more embodiments, the number and type of friends or characteristics of friends of the participants may be analyzed and employed as indicators. The personalized and interactive nature of social media allows this type of analysis of online promotion testing based on friends and the characteristics of friends. This is an additional and/or alternative highly advantageous feature of embodiments of the invention.

In one or more embodiments, the analysis result also serves as a feedback signal to enable the determination of when statistically significant analysis result has been obtained and the online promotional testing may stop. For example, the responses from the participants may be analyzed and if it is ascertained to a certain predefined level of certainty (which may be specified in advance) that 30-50-years-old participants redeems coupons for potato chips 20% more if the local football team wins or if the promotion happens on Saturday, promotional testing may stop such that generalized public promotions targeting 30-50 years old consumers may be executed accordingly. In this manner, online promotional testing may be performed more efficiently since the technique takes the guesswork away from the question of when online promotional testing should stop or is sufficient to enable the creation of an improved generalized public promotion.

At any rate, the results of the analysis of the participants' responses may be employed to gain insights into the behavior of participants. The responses may be analyzed in light of various combinations of personalized and/or non-personalized indicators, as mentioned.

For example, the lift in the response rate due to the promotion may be analyzed in light of one or more indicators. As another example, the lift in the profit margin (e.g., margin lift) may be analyzed in light of one or more indicators. As yet another example, the return on investment (ROI) may be analyzed in light of one or more indicators. The indicators may be any combination of personalized social media data and/or non-personalized social media data and/or other data that can be used to segment. These are only examples are not meant to be exhaustive.

The insights gained are then employed (1308) to more precisely craft generalized public promotions that would advance the goal of the advertiser (e.g., gain market share, increase revenue and/or increase profit). It should be noted that the generalized promotions crafted based on insights gained via social media online promotion testing may be administered online, may be administered to brick-and-mortar stores, in print, and/or in a different e-commerce setting. In other words, although the online promotional testing may be performed using online social media, the result may be tailored to platforms other than online social media or even other than online. In the brick-and-mortar setting, for example, personalized data may be obtained from credit card companies or from loyalty program data of a merchant for use in creating target groups for the generalized public promotion. Analogously, in the e-commerce setting, personalized data may be obtained from the user's registration information or user account information or gleaned from the user's participation in that e-commerce site for use in creating target groups for the generalized public promotion. Non-personalized data may be obtained via information and news sources, for example.

Further, the generalized public promotion may be implemented using either the same online offers technique (such as online coupon for example) or via a different technique such as for example via paper coupon or via an electronic coupon that can be displayed on a smartphone for checkout purpose or via a promotional code emailed to the participant.

Figure 14:
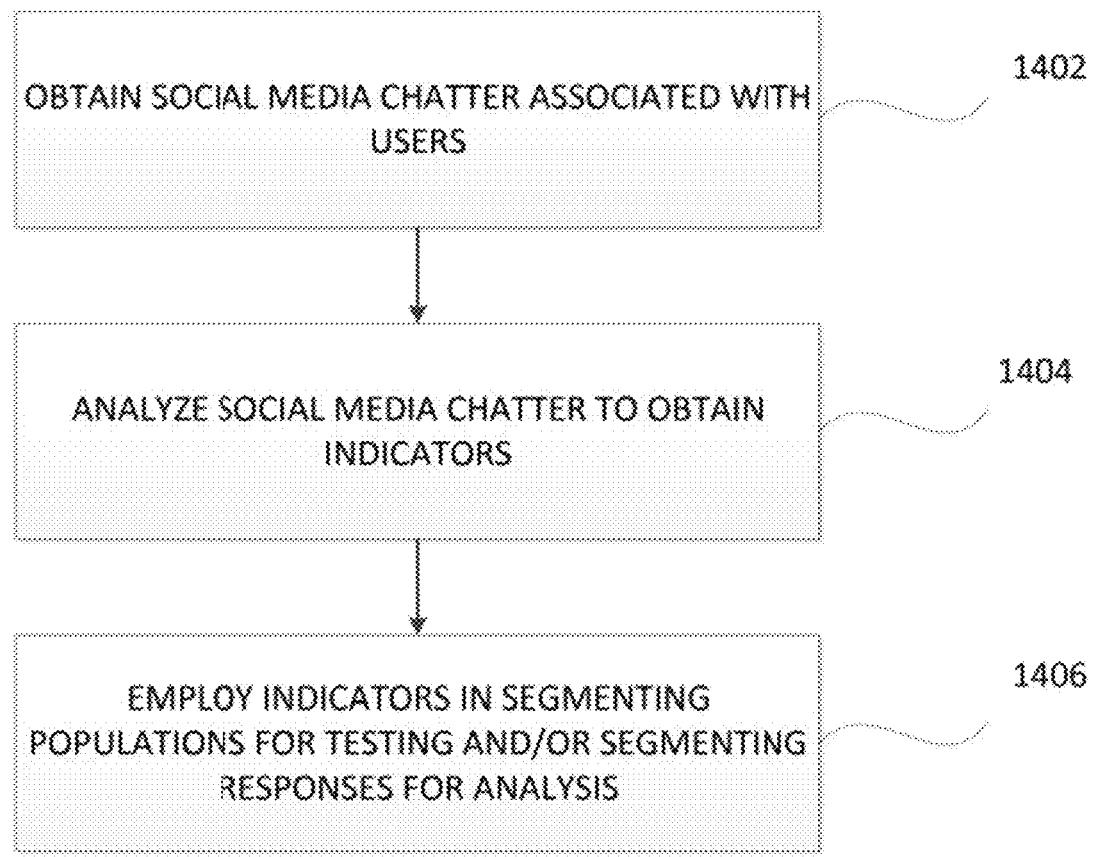
FIG. 14 shows, in accordance with an embodiment of the invention, an analysis module for gathering and employing indicators based on social media chatter to select the subpopulations to be tested during the testing phase of the online promotion testing and/or to group responses to online test promotions in the analysis phase in order to gain insights.

FIG. 14 shows, in accordance with an embodiment of the invention, an analysis module for gathering and employing indicators based on social media chatter to select the subpopulations to be tested during the testing phase of the online promotion testing and/or to group responses to online test promotions in the analysis phase in order to gain insights. These indicators may be obtained by analyzing social media chatter (such as user posts or comments), in an embodiment.

In step 1402, the social media chatter associated with social media users is obtained. For example, textual posts or pictures posted by each user of the social media site or by each user of a group of users of the social media site may be obtained.

In step 1404, the social media chatter is analyzed. The analysis may be based on context or based on keywords and may employ any suitable statistical and/or linguistic and/or pictorial analysis technique, for example. In an embodiment, machine learning may be employed. From the analysis, the user's interests, hobbies, likes, dislikes, attitudes, etc. may be obtained. In an embodiment, the social chatter of a user may be analyzed to obtain information about the behavioral economics principle(s) that influence(s) that user. These behavioral economics principles may be used as indicators for user grouping prior to online promotion testing or response result grouping during the analysts phase to gain insights, for example.

In step 1406, the obtained analysis result from the social media chatter associated with each user may be employed as indicators, either without or without other personalized and/or non-personalized indicators, to group users for testing purpose during the testing phase of online promotional testing. Alternatively or additionally, the obtained analysis result from the social media chatter associated with each user may be employed as indicators, either without or without other personalized and/or non-personalized indicators, to group responses during the analysis phase of online promotional testing for analysis purposes. In an example, the chatter-based indicators may be combined with time-dependent indicators (such as whether a given sport team was playing when the online promotion is administered) for user grouping during the testing phase or for result grouping during the analysis phase.

As can be appreciated from the foregoing, embodiments of the invention take advantage of the ability to generate automatically a large number of test promotions, of the availability of users of the social media site and vast quantity of very personalized information associated with the users as well as of the communication facilities associated with the social media site in order to efficiently generate and administer online test promotions to different subpopulations. Embodiments further obtain personalized indicators as well as non-personalized indicators (including time-dependent indicators) in order to use these indicators to group users for testing purpose and/or to group analysis results to reveal insights. These insights may permit the generalized public promotion to be more precisely created and targeted to obtain the desired goal.

One of the challenges in conducting promotion testing of consumer products relates to the cost and effort involved in conducting a sufficient number of test promotions with a sufficient number of test consumers such that the insights gained from the test promotions can fairly be deemed to be valid. For example, it is important that the insight gained from such promotion testing accurately predicts the likely result of a given promotion if such promotion is offered to the general public after promotion testing.

The challenges arise, in part, because it is costly and time consuming to recruit a large number of people for the purpose of conducting promotion testing using current testing paradigms. In the current testing paradigms, identifying, organizing, and conducting test promotions with a large number of people tend to require significant effort and time commitment.

The challenge is particularly felt by manufacturers having many products that require promotion testing. If a test methodology requires an unduly large amount of effort on the part of a manufacturer to conduct test promotions for a large number of different products, promotion testing by that manufacturer may be reduced or eliminated, thus raising the risk that the actual promotions offered to the public would not achieve the desired result in the absence of accurate insights gained from real world data and rigorous analysis thereof. Scalability is thus a challenging issue for many manufacturers, especially when many products are involved and each product may require numerous tests to obtain valid insights.

Further, the test promotions themselves have to be carefully designed to ensure that such test promotions are substantially free of unintended bias and of unintended test variable interactions, which would result in inaccurate insights from the promotion testing campaign. Some manufacturers may have limited expertise and/or manpower to effectively design test promotions to avoid such unintended bias and unintended variable interactions. As a consequence, if the promotion testing of each product requires too much effort or expensive expertise to properly design a test promotion campaign, promotion testing may also be reduced or eliminated.

Additionally, it has become increasingly difficult to interest people in participating in promotion testing. As people's lives become busier, there is less incentive to take the time and effort to participate in promotion testing particularly if there is insufficient incentive to do so.

For example, if a consumer product item is low cost and the incentive is relatively modest, a one-off incentive (such as save 25 cents off a 6-oz bag of potato chips) may not catch the attention of many people as they are busy going about their lives. Increasing the compensation to attract interest is problematic since the increased compensation, if not offered for the general public after promotion testing ends, would represent a difference between the promotion test environment and the real world shopping environment. If the test consumer behaves differently because of the extra compensation offered during promotion testing, the insights obtained from the test promotion campaign may not accurately forecast the result when a given promotion is selected for general roll-out to the shopping public.

Further, because it is costly and difficult to recruit test consumers, it is important to efficiently use the pool of available test consumers. If a test consumer is utilized to test only a single test promotion of a single product from a single manufacturer, every promotion effectively requires a test consumer. If, for example, a product involves 30 different test promotions to test out all variable combinations, and each promotion requires 100 test consumers participating to generate statistically valid test data, 3,000 test consumers would be required if the testing methodology only utilizes each test consumer to test only a single test promotion of a single product from a single manufacturer. This inefficient approach to utilizing the pool of available test consumers limits the scalability of promotion testing as a whole, unless improved infrastructures and methodologies are developed to more efficiently utilize the test consumers for promotion testing purposes.

In accordance with one or more embodiments of the invention, there are provided improved platforms and methodologies for performing promotion testing in a highly scalable and cost-effective manner. In one or more embodiments, a website implementing a web application that is accessible via the internet is offered.

To the manufacturers, the website/web application represents a platform where test promotions may be efficiently created and offered to the public. Aspects of automating the generation of test promotions and automating the administration of test promotions have been discussed earlier in this application as well as in the patent applications listed above and incorporated by reference herein. Any of those techniques and structures may be employed by the manufacturer to efficiently generate a large number of valid test promotions for its products. As will be discussed later herein, there is efficient scalability not only with respect to test promotion generation but also with respect to the execution of a large number of test promotion campaigns in parallel. Additionally, there is efficient scalability with respect to the use of the pool of available test consumers so that a limited number of test consumers may still produce valid insights for a large number of test promotions.

To the public members who visit the website/web application, the website/web application appears, on the surface, as another promotion aggregator site, offering promotions from one or more manufacturers. The promotions themselves, while not "real" in the sense that they have been offered to the public, nevertheless confer real benefits to the public members who visit the website and take advantage of such test promotions. For example, the visitor is offered a discount in a test promotion, that discount is effective and can be redeemed just like any other general public promotion. This discount incentivizes the website visitor in the same way that a real world consumer would be incentivized by the same discount, thus reducing the bias that may be introduced by an unrealistic testing environment and/or unrealistic incentives.

In an example, the website/web application offers promotions in the form of electronic coupons, each of which pertains to a product and is designed to test a particular combination of test promotion variable values. By accessing the website, the website visitor becomes in effect a test consumer, and the response by that visitor to any test promotion would constitute in effect a vote pertaining to that test promotion. For example, if the visitor elects to take advantage of the promotion offered to him (by, for example, saving the coupon to an electronic shopping cart associated with his account), his affirmative response would be tracked. On the other hand, if the consumer does not take advantage of the offered promotion and skips the promotion, his response is also tracked. These responses are tabulated and employed for the analysis purposes.

Preferably, each visitor has an account such that his visits to the website and responses would be trackable across visits and/or time. If the website/webpage implements promotion testing for different manufacturers and/or different products, his responses would also be trackable across products and/or manufacturers. This is different from the prior art one-off approach whereby testing data for a single test consumer tends to be collected for a single test promotion pertaining to a single product from a single manufacturer. Without such tracking, it would be impossible to ascertain whether there exist unintended variable interactions or biases or influences when a given test consumer is exposed to different promotions for different products by different manufacturers at different times, for example.

In one or more embodiments, the website/web application implements test promotions for different manufacturers and different products instead of a single manufacturer. Aggregation of promotions in this case offers a highly desirable side effect of increasing product diversity and richer content for the website, which increases the chance that one (or likely multiple) of the multitude of promotions offered would be of interest to the website visitor.

If a website visitor can take advantage of five or six or more promotions pertaining to different products by different manufacturers, that visitor would be more likely to want to return in the future to again participate and take advantage of other promotions since there is sufficient pay off for the effort to visit the website and take advantage of many discounts offered even if each individual discount is fairly small (small discounts tend to be the case for consumer products due to, for example, the modest overall cost of each consumer product).

As more people participate, more test promotions may be executed and since the test promotions are implemented via software, the incremental per-visitor cost is fairly minimal beyond the intrinsic cost of the discount. As such, the cost of promotion testing would decrease over time. When promotion testing cost is reduced, manufacturers can afford to increase their participation, thus further increasing the number of test promotions available and making the website content richer, which in turn attracts even more people to the website. This network effect (i.e., the phenomenon whereby a good or service becomes more valuable when more people use it) serves to increase the number of test promotions that can be offered for each product, as well as to increase the sample size (i.e., the number of people participating) in each test to drive the improvement in insight accuracy. As will be discussed later herein, methodologies are provided to efficiently reuse the pool of available test consumers for different test promotions, thus further reducing the per-test cost.

Figure 15:
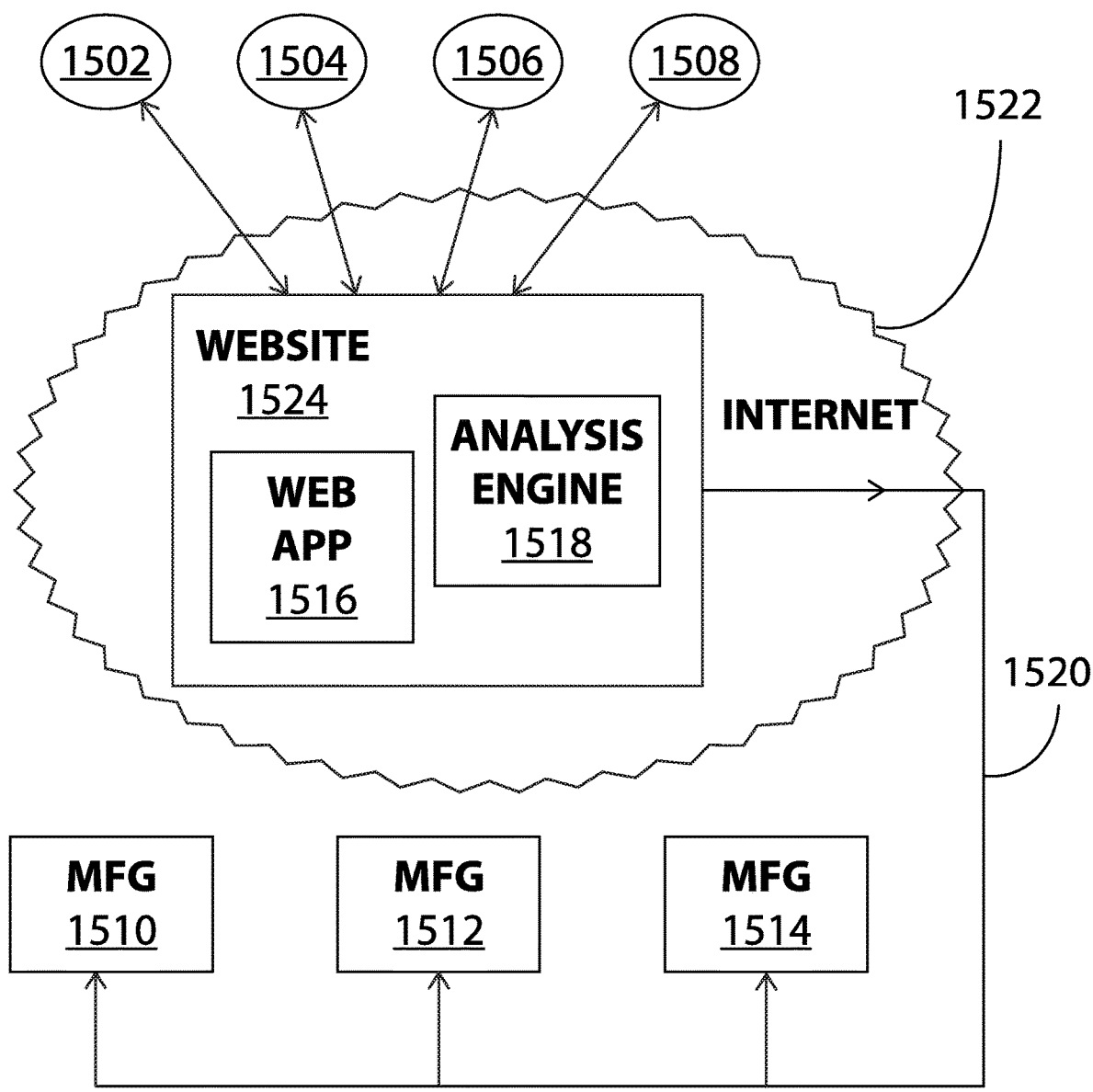
FIG. 15 shows, in accordance with one or more embodiments of the invention, a simplified schematic of conceptual drawing of the promotion testing facility (PTF).

FIG. 15 shows, in accordance with one or more embodiments of the invention, a simplified schematic of conceptual drawing of the promotion testing facility (PTF) 1500. A plurality of example manufacturers 1502, 1504, and 1506 interact via internet 1522 with the web application 1516 through website 1524 to furnish information about one or more products or services that require promotion testing. Manufacturers 1502, 1504 and 1506 may represent manufacturers in the same or different industries offering similar or different products. Web application 1516 receives the product information and promotion information variables for testing (e.g., different graphics, different discounts, different product, sizes, different combinations with other products) and formulates, partly or wholly, the plurality of test promotions, each of which representing a different combination of the test promotion variable values. Techniques for generating such test promotions have been discussed herein and in the above-listed patent applications that are incorporated by reference herein. Alternatively, the manufacturer may formulate the test promotions themselves and upload the test promotions to web application 1516 for promotion testing.

Website visitors 1502, 1504, 1506, and 1508 represent visitors to website 1524 via internet 1522. Visitor access may be accomplished via a browser, which may be desktop-based or mobile. These visitors may represent repeat visitors or visitors attracted to website 1524 for the first time through web-based advertising or other referral mechanisms. Each of visitors 1502-1508 is preferably registered with an account for tracking purpose. Bibliographic data pertaining to each visitor, whether acquired through the account registration process, from the referral website, or through data mining, may then be employed to determine the categories of products that the visitor may be interested in. If no visitor-related data is available, the product categories may be randomly assigned until better information may be acquired for that visitor, for example.

When the visitor visits website 1524, the visitor account information (which may be obtained from cookies or may be obtained by the visitor's own log-in information) may be consulted to ascertain whether the visitor has visited in the past and what promotion campaigns (and past promotions) the visitor has been exposed to. This is to better formulate the promotions to present to the visitor, to avoid duplication (if duplication is undesirable) or inconsistent presentation of promotions, or to continue where the visitor left off from a past visit. The exact promotions to be presented each time the visitor visits depends on the business logic implementing the test promotion, which business logic in part takes into account the goal of the test promotion campaign as well as any other requirements.

Web application 1516 is capable of presenting and is configured to present the test promotions pertaining to different (or the same) manufacturers pertaining to different (or the same) products simultaneously to different visitors. Leveraging modern highly scalable data processing and data communication technologies, it is contemplated that web application 1516 may serve thousands or millions of visitors simultaneously, executing thousands or more test promotion campaigns in the process. By way of example, cloud-based processing and related database technologies (such as columnar-based and unstructured databases) may be employed to handle the large number of simultaneous promotion tests.

The responses by the visitors are tracked. For example, the visitor may be presented with a given test promotion (e.g., 20% off when buying a 24-oz bag of potato chips brand A) having some particular characteristics (e.g., red background, sports theme) and the visitor may elect to take advantage of that promotion by indicating the selection of that promotion (analogous to clipping a coupon in the paper coupon context) to move that promotion to the "selected" set in the visitor's account. In an embodiment, the selection is evidenced by moving that promotion to the electronic shopping cart of the visitor's account or by some other means of tracking the visitor's selections.

Even if the visitor does not select a promotion that has been presented to that visitor, the non-selection information may also represent important data that may inform the web application 1516 that the promotion presented did not elicit a positive response. In other embodiments, the response may take the form of a grade instead of select/non-select and may be multivariate, for example. Other forms of response may also be possible. In one or more embodiments, the data pertaining to the promotion campaign, to the promotions presented, to the visitor responses would be tracked across different visits, across time, across different products and/or different manufacturers to enable data mining at a later time for any possible influence or bias or other hidden correlation that may skew the analysis or yield additional insights.

Analysis engine 1518 represents the analytical logic employed to gain insights into the efficacy of various test promotions from visitor response data as well as other data that may be relevant to the analysis (e.g., bibliographic data, external factors, etc.). Various techniques for such analysis have been discussed earlier herein and in the patent applications that have been incorporated by reference herein. Other techniques are also available and may also be employed for such analysis. The goal is to understand and predict consumer response to any particular promotion variable value or any particular combination, of promotion variable values. Another goal is to uncover promotion variable values and/or promotion variable value combinations that likely or most effectively produce the desired result (e.g., profit increase, volume increase, market share increase, etc.).

The analysis result may be communicated (1520) to the manufacturers (1510, 1512, and 1514) for use in, for example, deciding which promotion would be selected for roll-out to the general public. The insights obtained by analysis engine 1518 may also help the manufacturer in formulating future promotions. Although only a few manufacturers and a few visitors are shown in FIG. 15, it should be understood that there is no limitation to the number of manufacturers or to the number of visitors and to any particular product or service.

Figure 16:
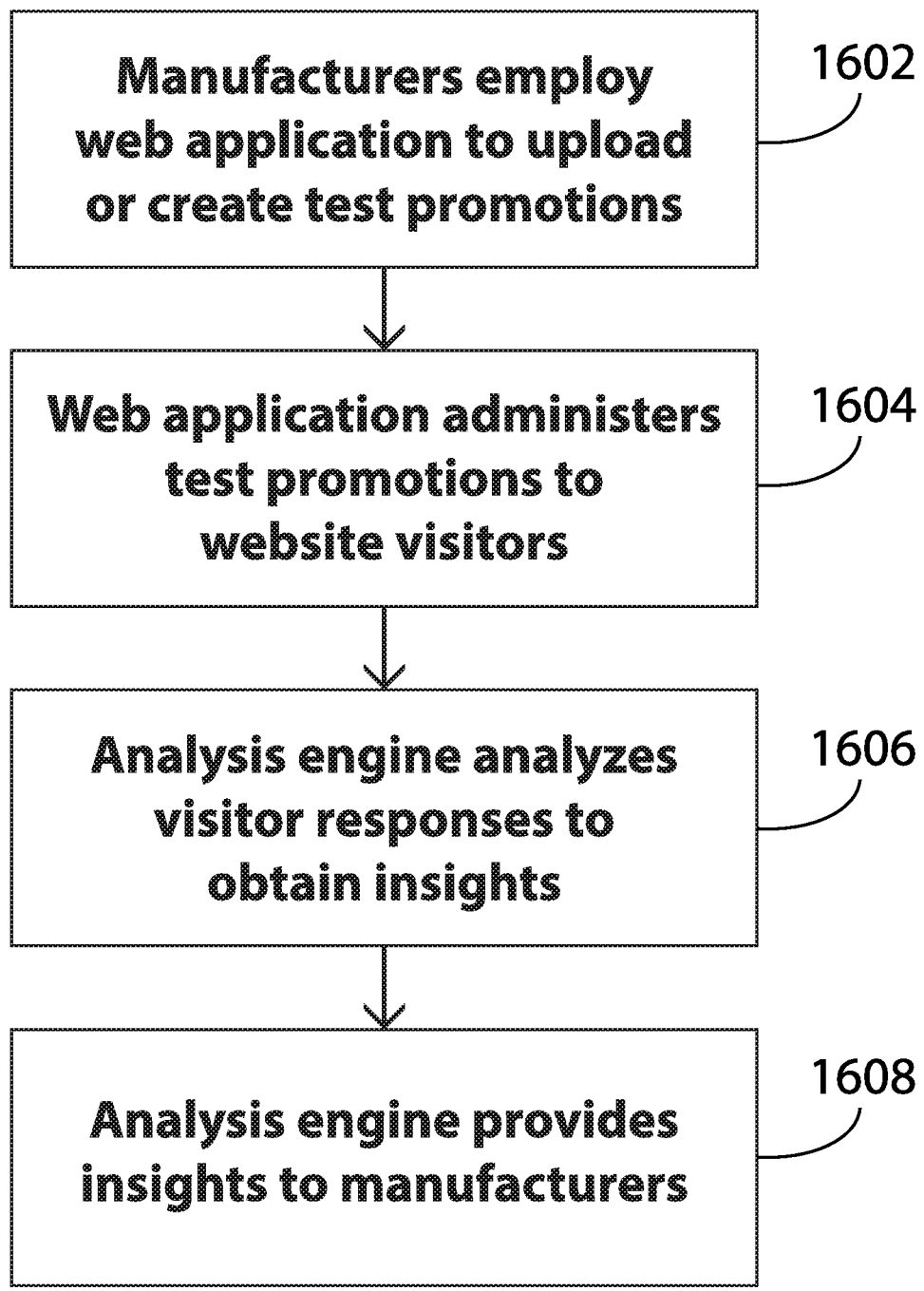
FIG. 16 illustrates, in accordance with one or more embodiments of the invention, a method for promotion testing that involves interaction between the website/web application and a given manufacturer.

FIG. 16 illustrates, in accordance with one or more embodiments of the invention, a method for promotion testing that involves interaction between the website/web application and a given manufacturer. In step 1602, the manufacturer employs the web application to generate test promotions from data furnished by the manufacturer regarding the product to be tested and test promotion variables to be tested. These test promotions are then administered to the website visitors in step 1604 in one or more visits by the visitors.

As will be discussed later herein, there exist multiple promotion testing approaches for presenting the promotions to the visitor. The various approaches differ with respect to efficient usage of the visitor population, efficient presentation of test promotions, the degree to which the promotion presentation mimics real-life paper coupon presentation, the degree to which bias or influences are isolated, etc. Each test promotion approach involves advantages, disadvantages and trade-offs, as will be discussed later herein.

In step 1606, the web application analysis engine analyzes the data obtained from the visitor responses as well as from other data available. The result of the analysis represents insights into consumer behavior when the consumer is presented with a given promotion variable value (e.g., patriotic theme) or a combination of promotion variable values. In step 1608, the analysis result is transmitted to the manufacturer, along with recommendations (if any) to enable the manufacturer to, for example, ascertain the most result-effective promotion to release to the general public for a given product.

Figure 17:
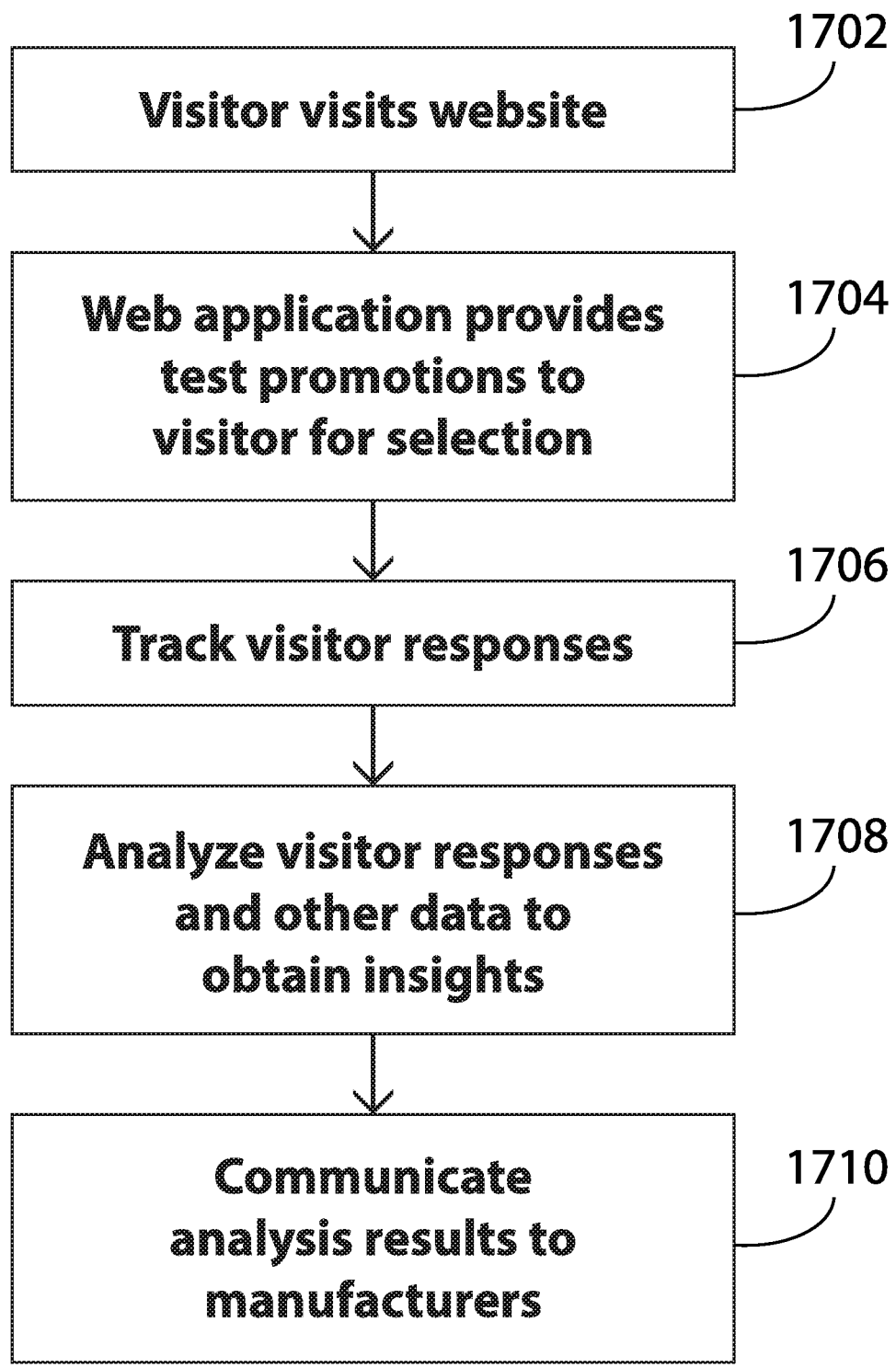
FIG. 17 shows, in accordance with one or more embodiments of the invention, a method for promotion testing that involves interaction between the website/web application and the website visitor.

FIG. 17 shows, in accordance with one or more embodiments of the invention, a method for promotion testing that involves interaction between the website/web application and the website visitor. In step 1702, the visitor visits the website that implements the web application administering the test promotions. As mentioned, the visitor is associated with an account, which may be used to track the visitor's responses to the test promotions as well as track past visits (including any promotion campaign already tested or currently being tested with this visitor). In step 1704, the visitor is provided with one or more test promotions in accordance with one or more of the promotion testing approaches mentioned earlier.

In step 1706, the visitor responses are tracked. The visitor may then be presented with additional test promotions until the visitor terminates the current visit. To terminate the current visit, the visitor may, for example, navigate to the electronic shopping cart or to the data area where selected promotions are kept in order to employ those coupons in purchasing the products. For example, the visitor may print out the coupons, email the coupons to his email account, move the coupons to his desired storage area in local storage on his computer or in an online account, or redeem the coupon.

The test promotions presented to a visitor may pertain, without limitation, to the testing of a single product or multiple products associated with a single manufacturer or different manufacturers. In this sense, the same visitor is "reused" by the website to test different test promotions for different promotion testing campaigns in each visit.

This is different from the prior art approach of having the visitor providing responses only to a single promotion (e.g., whether the visitor would take advantage of a 20% off promotion for a 24-oz box of cereal of a certain brand from a certain manufacturer). In one or more embodiments of the invention, the promotions presented, whether simultaneously to the visitor in a given webpage or in different webpages during a given visit, may for example pertain to a 20% off promotion for a 24-oz box of cereal of brand A for manufacturer B, a $2 off promotion for a 12-pack of pens of brand C from manufacturer D, a $50 discount off a package of tax preparation service from accounting firm F, for example. These are real promotions to the visitor in the sense that these promotions are redeemable for the values stated in the promotions if these promotions are selected by the visitor. As discussed earlier, the visitor response constitutes in essence a vote and furnishes data pertaining to the visitor's behavior with regard to that promotion. Such data may then be compiled and analyzed (1708) to obtain insights as discussed earlier.

The analysis result may be communicated to the manufacturers (step 1710) for use in, for example, deciding which promotion would be selected for roll-out to the general public.

As mentioned earlier, there exist many promotion testing approaches for presenting the promotions to the visitor. Each test promotion approach involves advantages, disadvantages and trade-offs. FIGS. 18, 19, and 20 illustrate three example approaches. It should be understood, however, that the invention is not limited to any specific test promotion approach of FIGS. 18-20 or any combination thereof.

FIG. 18A illustrates, in accordance with one or more embodiments, an example of the parallel experiment approach wherein each webpage presented to the visitor shows only a single test promotion. This approach isolates the test promotion such that influence from other test promotions on the same webpage would not be a factor (as there would be no other test promotions except for the one test promotion shown in that webpage).

Thus, test promotions 1804, 1810, and 1812 are shown in three separate webpages 1802, 1806 and 1808. A different visitor may see one or more of test promotions 1804, 1810, and 1812 and may see those test promotions in a different order or the same order. Yet a different visitor may see one or more of test promotions 1804, 1810, and 1812 interspersed with other test promotions and those test promotions 1804, 1810, and 1812 themselves may be presented in a different order or the same order. Since this is promotion testing, variations of test promotions 1804, 1810, and 1808 may be presented to the same or different visitors to ascertain the visitor responses to those variations. These variations represent different combinations of test promotion variable values for that product.

The point is each webpage presents only a single test promotion in the parallel experiment approach and randomization may be implemented to eliminate as much as possible any influence or bias that a particular sequence or order of presentation of webpages may cause. If, however, it is desirable to test whether a given order of presentation or a particular sequence of webpage presentation would have influence on the visitor behavior, such sequence or order may be enforced and tested if desired.

Webpage 1802 is an example and may include buttons C and S, representing choices "Clip" or "Skip" for the test promotion being presented. If the visitor clicks on button C ("Clip") to save that promotion to shopping cart 1830, the promotion is saved to that visitor's account and the next test promotion (such as test promotion 1810 in webpage 1806) is then presented. Alternatively, if the visitor clicks on button S ("Skip") to indicate a lack of interest, the next promotion is then presented to again allow the visitor to indicate whether he would like to clip or skip.

The visitor response data may then be tabulated. For example, for a given test promotion campaign, the data tracked may include the total number of test promotion presented (e.g., this test promotion was shown to a total of 400 visitors), the number of "clips" out of those 400 presentations, the number of "skips", etc. For each visitor, the data pertaining to which promotion has been shown and when, whether the visitor clips or skips for any give promotion presentation, etc. may also be tracked.

The visitor response data may then be employed for analysis to obtain insights as discussed earlier.

Upon return visit the visitor may be shown none, some, or all the test promotions shown in one of the earlier visits.

It should be noted that by presenting different test promotions to the same visitor in a given visit, the visitor is essentially "reused" to test different test promotions pertaining to the same or different products for the same or different manufacturers. This reuse represents a more efficient utilization of the pool of available test consumers since human testers are expensive to acquire. In the example of FIG. 18, the same visitor is provided with three different test promotions before he quits the current visit. By way of example, test promotion 1804 may pertain to candies from a particular manufacturer X, test promotion 1810 may pertain to soda from a particular manufacturer Y, and test promotion 1812 may pertain to pencils from a particular manufacture Z. In contrast, the prior art disjointed approach to testing would require three different test consumers, and there would be no way to track the consumer behavior across different manufacturers and/or different products.

It should be understood that there is no requirement that the test promotions shown to a given visitor in a given visit must pertain to different products, different product categories, or different manufacturers. It may very well be that some promotion testing strategies may, for example, call for different test promotions implementing different discounts for the same product be presented to the same visitor in a given visit. The point is there is flexibility in accommodating any business logic that may implement any particular promotion testing strategy.

As discussed earlier, the visitor responses in the example of FIG. 18A essentially represent votes and furnish data pertaining to the visitor's behavior with respect to the promotions presented. Such data may then be compiled and analyzed to obtain insights as discussed earlier.

Figure 18B:
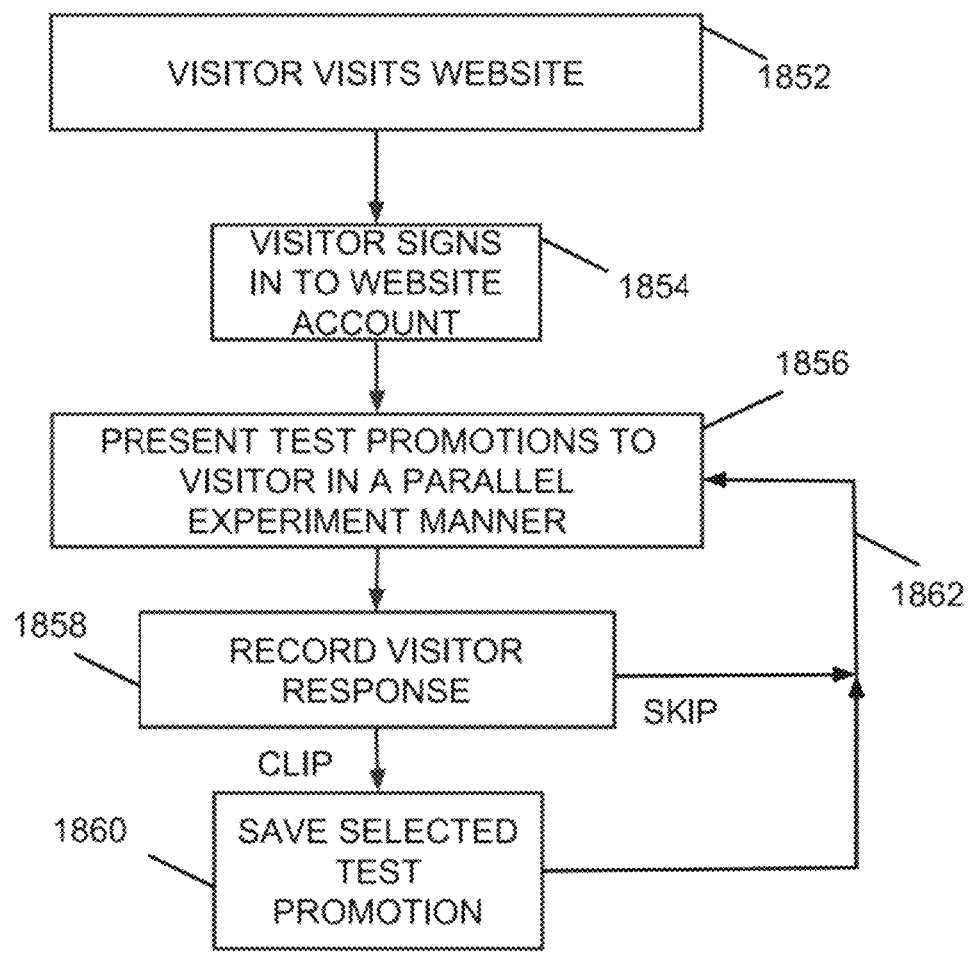
FIG. 18B illustrates, in accordance with an embodiment of the invention, the steps for implementing the parallel experiment approach.

FIG. 18B illustrates, in accordance with an embodiment of the invention, the steps for implementing the parallel experiment approach. In step 1852, the visitor visits the website.

In step 1854, the visitor signs into the website. Manual sign-in may be required with each visit. For example, the visitor may furnish biometric data or user name and password, whether directly with the website or via some affiliate website (such as via social media site sign-in) or single sign-on (SSO) solution. Alternatively, the user may be automatically signed in using a cookie associated with the user's browser or based on some form of identity (such as browser or smart phone or computer component identification) such that manual sign-in is not necessary each time the user visits the website. Irrespective, the visitor has an account, and such account is employed to track the visitor's past and current visit activities and also furnish a facility (e.g., an electronic shopping cart facility) for accumulating promotions that the visitor wishes to take advantage of.

In step 1856, the test promotions are presented to the visitor, with each test promotion being shown in each webpage or page view. The point is to isolate the test promotions from one another when presented to the visitor such that each view has one test promotion.

In step 1858, the visitor's response is recorded. The visitor is permitted, in an embodiment to either select (clip) the test promotion or reject (skip) the test promotion and the choice (select or reject) is recorded for future analysis of the performance of the test promotion.

If the visitor selects the test promotion, that test promotion may be saved (1860) in the visitor's shopping cart (e.g., a coupon for later redemption at the brick-and-mortar store or online) or the visitor may be presented with an option to convert that test promotion into a benefit (such as points for later use) or the visitor may be presented with an option to transmit (e.g., email or text or transfer via some other mean) the selected test promotion to another account for later usage.

After the test promotion is selected or if the visitor rejects (1862) the test promotion, the method loops back to step 1856 to present another promotion for selection or rejection (and data recording thereof).

The cycle that comprises steps 1856, 1858 and either 1860 (responsive to visitor acceptance/selection of the test promotion) or 1862 (responsive to the visitor rejection of the test promotion) is repeated until the visitor quits the current session. (by, for example, clicking on the shopping cart and checking out the saved test promotions or simply leaving the website to terminate the current session).

It should be noted that irrespective of how or whether the visitor eventually redeems the test promotions he selected, the data pertaining to the visitor's selection or rejection is recorded for each test promotion presented. This data pertaining to the visitor's selection or rejection essentially represents the visitor's "vote" with respect to the test promotion presented and employed to analyze the test promotion performance as discussed in connection with FIG. 18A.

Figure 19A:
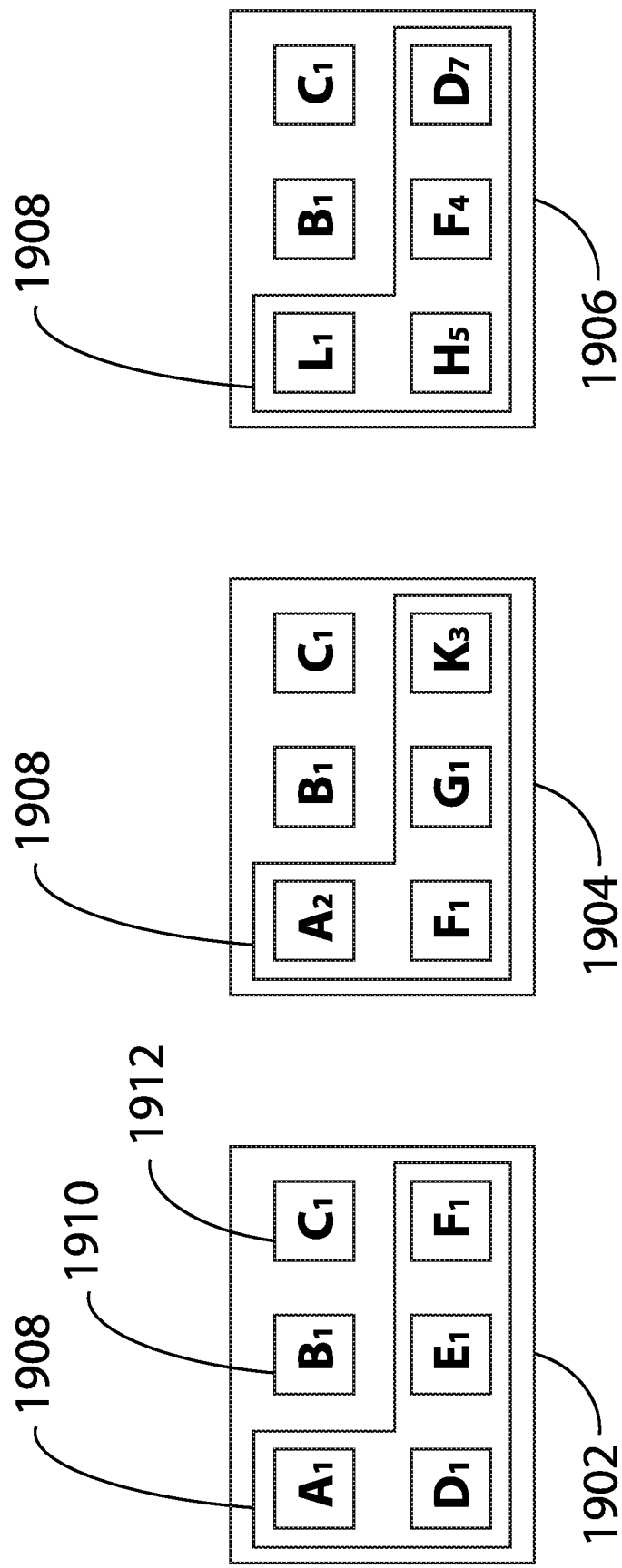
FIG. 19A illustrates, in accordance with an embodiment of the present invention, a randomized experiment approach.

FIG. 19A illustrates, in accordance with an embodiment of the present invention, an example of a randomized experiment approach wherein each webpage presented to the visitor shows multiple test promotions. This approach maximizes content presentation in each web page since multiple promotions may be presented simultaneously in a given webpage. Presenting multiple promotions together in the same webpage may also make the visitor more comfortable since this presentation may better mimic what the visitor is already familiar with in the paper coupon world.

In one or more embodiments, one or more test promotions may be deemed "assigned" to a particular visitor account and such promotion/promotions may be shown to the visitor for testing purposes multiple times in different webpages in a given visit and/or over different visits. The other promotions on the same webpage may be randomly selected or may vary each time the assigned promotion/promotions would be presented to the visitor.

The randomized experiment approach aims to maximize content presentation in a given webpage while eliminating biases from the other non-assigned promotions that are present in the same webpage. Since the other non-assigned promotions are randomly selected and positioned, the influence or bias from any specific non-assigned promotion is mitigated. For example, if the promotion for 20% off a 12-oz box of cereal is shown 1000 times to 700 different visitors (who are assigned that cereal promotion) in various visits, the fact that other non-assigned promotions are randomized in the webpages would tend to mitigate the effect that any particular non-assigned promotion would have on the visitors' responses toward that cereal promotion.

If desired, the location(s) of the assigned promotion(s) may be kept the same on the webpage or may be randomized to further eliminate the chance that the location of the cereal promotion on the page may have an influence on visitors' behavior toward the cereal promotion. However, if location on a webpage is a variable to be explored, the location may be forced and insights pertaining thereto may be obtained from visitors' response data.

FIG. 19A illustrates, in accordance with one or more embodiments of the invention, an example of the randomized experiment approach whereby three webpages 1902, 1904, and 1906 present assigned promotions 1910 (B1) and 1912 (C1). To simplify discussion, the locations of each assigned promotion B1 and C1 are kept fixed but they may also be varied or randomized as discussed. The non-assigned set 1908 for webpage 1902 comprises promotions A1, D1, E1, and F1. The non-assigned set 1908 for webpage 1904 comprises promotions A2, F2, G2, and K3, representing a different non-assigned promotion set from that of webpage 1902. The non-assigned set 1908 for webpage 1906 comprises promotions L2, H5, F4, and D7, representing yet a different non-assigned promotion set from that of webpage 1902 and webpage 1904. To simplify discussion, the locations of the non-assigned promotions are kept fixed in each webpage but they may also be varied or randomized as discussed. In the example of FIG. 19, each of the letters (e.g., A, B, C, D, etc.) represents a product and each of the subscripts (e.g., 1, 2, 3, 7, etc.) represents a particular combination of promotion variable values for the promotion of the product represented by the letter.

Webpages 1902, 1904, and 1906 may represent webpages presented to the same visitor in a given visit or across different visits. They may also represent webpages presented to other visitors who are selected to participate in the test promotion campaign for product B and C (and more specifically for promotions B1 and C1 thereof). Although two test promotions are assigned, it's possible that more than two or only one may be assigned. A visitor may select any other promotion on the webpage (even a test promotion that is non-assigned) to take advantage of the discount associated therewith and his response is also tracked. However, for the purpose of testing visitors' response to promotions B1 and C1, the showing of promotions B1 and C1 is necessary.

Similar to the parallel experiment approach, visitors are essentially "reused" in that a visitor is exposed to multiple promotions per webpage, and to multiple webpages in each visit until the visitor quits the visit. Thus a visitor may be used to test multiple promotions, thereby lowering the per-test cost.

As discussed earlier, the visitor responses in the example of FIG. 19A essentially represent votes and furnish data pertaining to the visitor's behavior when provided with a promotion (albeit among other promotions on the same webpage). Such data may then be compiled and analyzed to obtain insights as discussed earlier.

Figure 19B:
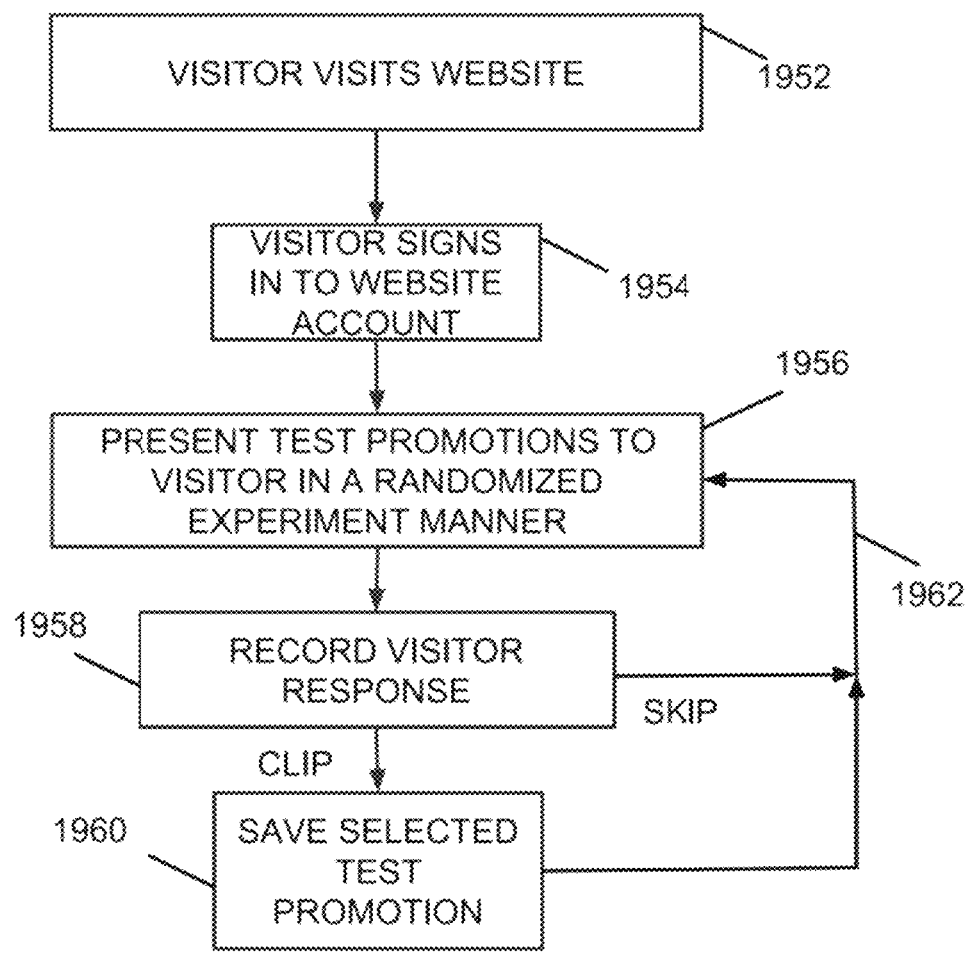
FIG. 19B illustrates, in accordance with an embodiment of the invention, the steps for implementing the randomized experiment approach.

FIG. 19B illustrates, in accordance with an embodiment of the invention, the steps for implementing the randomized experiment approach. In step 1952, the visitor visits the website.

In step 1954, the visitor signs into the website. Manual sign-in may be required with each visit. For example, the visitor may furnish biometric data or user name and password, whether directly with the website or via some affiliate website (such as via social media site sign-in) or single sign-on (SSO) solution. Alternatively, the user may be automatically signed in using a cookie associated with the user's browser or based on some form of identity (such as browser or smart phone or computer component identification) such that manual sign-in is not necessary each time the user visits the website. Irrespective, the visitor has an account, and such account is employed to track the visitor's past and current visit activities and also furnish a facility (e.g., an electronic shopping cart facility) for accumulating promotions that the visitor wishes to take advantage of.

In step 1956, the test promotions of interest assigned to this visitor (i.e., the test promotions for which performance data is being measured using this visitor) are presented to the visitor, with each test promotion of interest being shown together with other "non-assigned" promotions in each webpage or page view. The point is to present each test promotion of interest with other promotions so as to maximize content presentation and/or to present a familiar interface (e.g., in a newspaper coupon format with many coupons being seen at once) while ensuring that each view has only one test promotion of interest (albeit among other promotions also simultaneously presented). The other promotions (but not the test promotion of interest assigned to this visitor) may be randomized from page to page or from visit to visit for the same visitor, or randomized when presented to different visitors of the test pool of visitors employed to measure the performance of the test promotion of interest. As mentioned, such randomization of the non-assigned promotions may serve to mitigate the effect that any particular non-assigned promotion would have on the visitor's response toward the assigned test promotion.

In step 1958, the visitor's response is recorded. The visitor is permitted, in an embodiment, to either select (clip) the test promotion of interest or reject (skip—either explicitly or implicitly by moving on to other test promotions or other pages) the test promotion of interest and the choice (select or reject) is recorded for future analysis of the performance of the test promotion of interest. Alternatively or additionally, the visitor choice (select or reject) with respect to other promotions on same page may also be record, if desired, to also measure the performance of the other promotions, in one or more embodiments.

If the visitor selects a promotion (whether the assigned test promotion of interest or another test promotion on the same page), the selected promotion may be saved (1960) in the visitor's shopping cart (e.g., a coupon for later redemption at the brick-and-mortar store or online) or the visitor may be presented with an option to convert that selected promotion into a benefit (such as points for later use) or the visitor may be presented with an option to transmit (e.g., email or text or transfer via some other mean) the selected promotion to another account for later usage.

After selection or rejection is performed on the current page, the method loops back to step 1956 to present another promotion of interest (presented among yet other promotions in the same view) for selection or rejection (and data recording thereof).

The cycle that comprises steps 1956, 1958 and either 1960 (responsive to visitor acceptance/selection of one of the promotions shown) or 1962 (responsive to the visitor rejection of the test promotion) is repeated until the visitor quits the current session, (by, for example, clicking on the shopping cart and checking out the saved test promotions or simply leaving the website to terminate the current session).

It should be noted that irrespective of how or whether the visitor eventually redeems the promotions be selected (or whether the promotion selected is the test promotion of interest or another promotion on the same page), the data pertaining to the visitor's selection or rejection is recorded for each test promotion of interest presented. This data pertaining to the visitor's selection or rejection essentially represents the visitor's "vote" with respect to the test promotion of interest presented and employed to analyze the performance of the test promotion of interest as discussed in connection with FIG. 19A.

Figure 20A:
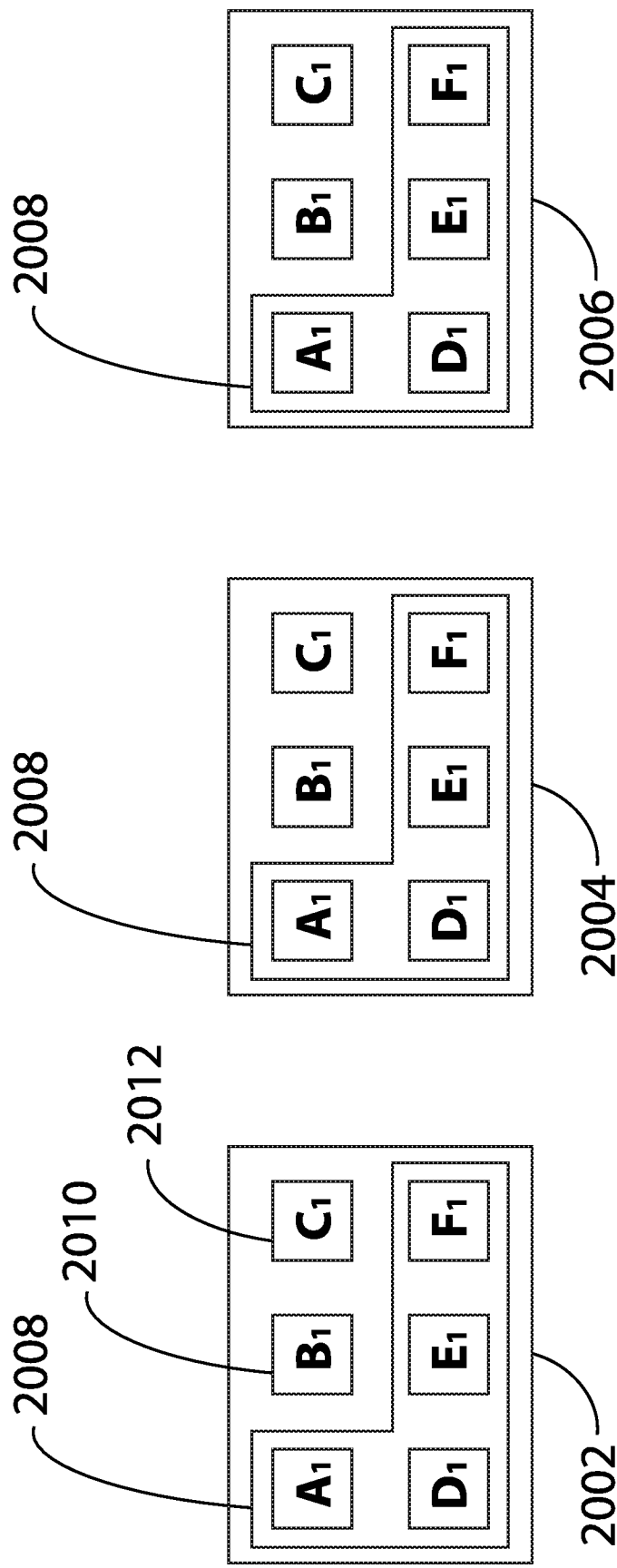
FIG. 20A illustrates, in accordance with one or more embodiments of the invention, an example of the controlled experiment approach.

FIG. 20A illustrates, in accordance with one or more embodiments of the present invention, an example of the controlled experiment approach whereby three webpages 2002, 2004, and 2006 present assigned promotions 2010 (B1) and 2012 (C1). FIG. 20 is a different variation of the randomized experiment approach of FIG. 19 in that although multiple promotions are shown per page (as is the case with FIG. 19), the non-assigned promotions are however not changed.

The non-assigned promotions A1, D1, E1, and F1 of non-assigned, set 2008 are kept the same in each of webpages 2002, 2004, and 2006. As in the example of FIG. 19, each of the letters (e.g., A, B, C, D, etc.) represents a product and each of the subscripts (e.g., 1, 2, 3, 4, etc.) represents a particular combination of promotion variable values for the promotion of the product represented by the letter.

By not varying the non-assigned promotions, any bias introduced by changing the other, non-assigned promotions on the webpage is eliminated. If the same visitor is presented with the same webpage containing assigned promotions B1 and C1 multiple times in the same or in different visits, the fact that the other, non-assigned promotions are constant in those webpages means that the visitor's response to promotions B1 and C1 is likely not influenced by changes to the non-assigned promotions.

If different visitors are presented with the same webpage containing assigned promotions B1 and C1, the fact that the other, non-assigned promotions are constant means that if there is any influence or bias from the non-assigned promotions, all visitors are presumably biased or influenced the same way. Thus a high degree of signal isolation is achieved.

Generally speaking, the controlled experiment approach also maximizes content presentation in each web page in that multiple promotions may be presented simultaneously. As in the case with the randomized experiment approach, presenting multiple promotions together in the same webpage may also make the visitor more comfortable since this presentation may mimic what the visitor is already familiar with in the paper coupon world.

As discussed earlier, the visitor responses in the example of FIG. 20A essentially represent votes and furnish data pertaining to the visitor's behavior when provided with a promotion (albeit among other promotions on the same webpage). Such data may then be compiled and analyzed to obtain insights as discussed earlier.

Figure 20B:
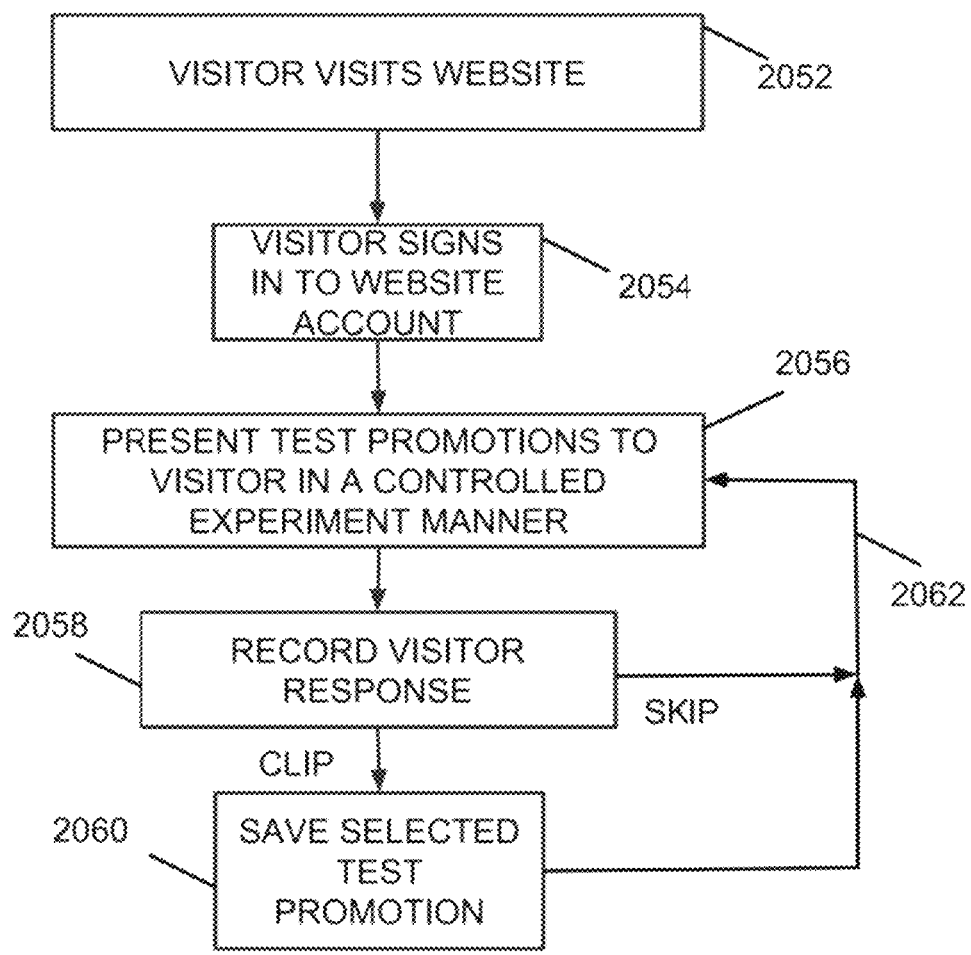
FIG. 20B illustrates, in accordance with an embodiment of the invention, the steps for implementing the controlled experiment approach.

FIG. 20B illustrates, in accordance with an embodiment of the invention, the steps for implementing the controlled experiment approach. In step 2052, the visitor visits the website.

In step 2054, the visitor signs into the website. Manual sign-in may be required with each visit. For example, the visitor may furnish biometric data or user name and password, whether directly with the website or via some affiliate website (such as via social media site sign-in) or single sign-on (SSO) solution. Alternatively, the user may be automatically signed in using a cookie associated with the user's browser or based on some form of identity (such as browser or smart phone or computer component identification) such that manual sign-in is not necessary each time the user visits the website. Irrespective, the visitor has an account, and such account is employed to track the visitor's past and current visit activities and also furnish a facility (e.g., an electronic shopping cart facility) for accumulating promotions that the visitor wishes to take advantage of.

In step 2056, the test promotions of interest assigned to this visitor (i.e., the test promotions for which performance data is being measured using this visitor) are presented to the visitor, with each test promotion of interest being shown together with other "non-assigned" promotions in each webpage or page view. The point is to present each test promotion of interest with other promotions so as to maximize content presentation and/or to present a familiar interface (e.g., in a newspaper coupon format with many coupons being seen at once) while ensuring that each view has only one test promotion of interest (albeit among other promotions also simultaneously presented). Unlike the randomized experiment approach of FIG. 19A and FIG. 19B, the other promotions are not randomized (i.e., kept constant) from page to page or from visit to visit for the same visitor, or randomized when presented to different visitors of the test pool of visitors employed to measure the performance of the test promotion of interest. As mentioned, keeping the non-assigned promotions constant from page to page eliminates any bias that may be introduced by changes in the non-assigned promotions.

In step 2058, the visitor's response is recorded. The visitor is permitted, in an embodiment, to either select (clip) the test promotion of interest or reject (skip—either explicitly or implicitly by moving on to other test promotions or other pages) the test promotion of interest and the choice (select or reject) is recorded for future analysis of the performance of the test promotion of interest. Alternatively or additionally, the visitor choice (select or reject) with respect to other promotions on same page may also be record, if desired, to also measure the performance of the other promotions, in one or more embodiments.

If the visitor selects a promotion (whether the assigned test promotion of interest or another test promotion on the same page), the selected promotion may be saved (2060) in the visitor's shopping cart (e.g., a coupon for later redemption at the brick-and-mortar store or online) or the visitor may be presented with an option to convert that selected promotion into a benefit (such as points for later use) or the visitor may be presented with an option to transmit (e.g., email or text or transfer via some other mean) the selected promotion to another account for later usage.

After selection or rejection is performed on the current page, the method loops back to step 2056 to present another promotion of interest (presented among yet other promotions in the same view) for selection or rejection (and data recording thereof).

The cycle that comprises steps 2056, 2058 and either 2060 (responsive to visitor acceptance/selection of one of the promotions shown) or 2062 (responsive to the visitor rejection of the test promotion) is repeated until the visitor quits the current session, (by, for example, clicking on the shopping cart and checking out the saved test promotions or simply leaving the website to terminate the current session).

It should be noted that irrespective of how or whether the visitor eventually redeems the promotions be selected (or whether the promotion selected is the test promotion of interest or another promotion on the same page), the data pertaining to the visitor's selection or rejection is recorded for each test promotion of interest presented. This data pertaining to the visitor's selection or rejection essentially represents the visitor's "vote" with respect to the test promotion of interest presented and employed to analyze the performance of the test promotion of interest as discussed in connection with FIG. 20A.

As can be appreciated from the foregoing, embodiments of the invention implement a highly scalable system and method for conducting promotion testing. Both the website visitors and the manufacturers are properly incentivized and motivated to participate, feeding a network effect that results, over time, in richer website content and a greater pool of test consumers.

To the manufacturers, embodiments of the invention represent a focal point and a platform for publishing test promotions. To the website visitors, embodiments of the invention provide the experience of a promotion aggregator site, whereby promotions from various manufacturers for different types of goods or services may be obtained. The web application executing in the background ensures that a large number of test promotions can be executed simultaneously, with scalability to handle increasing visitor traffic and flexibility to accommodate tradeoffs regarding efficiency and usability. Visitor response data tracked across visits and/or across time and/or across different manufacturers/goods allow insights to be obtained in a highly granular manner to enable manufacturers to better understand consumer response to any given test promotion variable and to select the most result-effective promotion for general public release.

By lowering the cost of acquiring test consumers and efficiently reusing the available pool of test consumers, embodiments of the invention lower the cost of promotion testing for manufacturers, thereby encouraging more manufacturers to participate in promotion testing via the website/web application. With more promotions offered, the richer content of the website in turn attracts more visitors, thereby feeding the network effect. Over time, the net result is an increase in both the number of test consumers available for promotion testing and the number of available test promotions (which appear as real promotions as far as visitors to the website are concerned). With the increase in the number of test consumers, promotion testing cost for manufacturers would decrease, and prediction accuracy would increase due to the availability of a larger volume of consumer response data for each test.

While this invention has been described in terms of several preferred embodiments, there are alterations, permutations, and equivalents, which fall within the scope of this invention. The invention should be understood to also encompass these alterations, permutations, and equivalents. It should also be noted that there are many alternative ways of implementing the methods and apparatuses of the present invention. Although various examples are provided herein, it is intended that these examples be illustrative and not limiting with respect to the invention.

The invention claimed is:

1. A computer-implemented method for subpopulation analysis that is performed by a promotion optimization system that includes a processor and memory, the method, comprising:
    generating a plurality of test promotions;
    receiving social media information for a plurality of consumers;
    extracting a series of attributes for each of the consumers from the social media information, wherein the attributes include at least a time duration of interest for each consumer, and behavioral economic principle that influences the consumers;
    setting a first set of the series of attributes as control criteria;
    setting a second set of the series of attributes as validation criteria;
    segmenting the plurality of consumers by at least one validation criteria and the control criteria, into segmented subpopulations of consumers;
    and
    matching the promotions to the plurality of segmented subpopulations of consumers.

2. The method of claim 1, wherein the plurality of segmented subpopulations of consumers are segmented by demographic information and interests identified in the social media chatter.

3. The method of claim 2, wherein the demographic information and interests are collected from social media posts, search key words, links clicked on, purchase history, download history, and location of the consumers.

4. The method of claim 2, wherein the interests include a topic, a duration of the interest, and a location of the interest.

5. The method of claim 1, wherein the social media chatter is analyzed by keyword analysis.

6. The method of claim 1, wherein the social media chatter is analyzed for behavioral economic principles.

7. The method of claim 1, wherein the social media chatter is analyzed by linguistic machine learning analysis.

8. The method of claim 1, further comprising the steps of tracking administered test promotions, selecting subsequent promotions and administering the subsequent test promotions, and wherein these steps are repeated until the consumer terminates testing.

9. The method of claim 1, wherein the test promotions are administered on a webpage displaying the test promotions.

10. The method of claim 9, wherein the webpage is rendered to have assigned promotions and non-assigned promotions.

11. The method of claim 10, wherein the non-assigned promotions are randomized each time a single consumer visits the webpage.

12. The method of claim 10, wherein the non-assigned promotions are randomized the first time a single consumer visits the webpage and remain the same for each subsequent visit.

13. A system for performing promotion optimization, comprising:
    a server including a processor and memory for:
        generating a plurality of test promotions;
        receiving social media information for a plurality of consumers;
        extracting a series of attributes for each of the consumers from the social media information, wherein the attributes include at least a time duration of interest for each consumer, and behavioral economic principle that influences the consumers;
        setting a first set of the series of attributes as control criteria;
        setting a second set of the series of attributes as validation criteria;
        segmenting the plurality of consumers by at least one validation criteria and the control criteria, into segmented subpopulations of consumers;
        matching the promotions to the segmented subpopulations of consumers based upon product categories that members of each segmented subpopulation are interested in derived from bibliographic data.

14. The system of claim 13, wherein the plurality of segmented subpopulations of consumers are segmented by demographic information and interests identified in the social media chatter.

15. The system of claim 14, wherein the demographic information and interests are collected from social media posts, search key words, links clicked on, purchase history, download history, and location of the consumers.

16. The system of claim 14, wherein the interests include a topic, a duration of the interest, and a location of the interest.

17. The system of claim 14, wherein social media chatter is analyzed by linguistic machine learning analysis.

18. The system of claim 13, wherein the test promotions are administered on a webpage displaying the test promotions.

19. The system of claim 18, wherein the webpage is rendered to have assigned promotions and non-assigned promotions.

* * * * *